United States Patent
Abe et al.

(10) Patent No.: US 8,670,132 B2
(45) Date of Patent: Mar. 11, 2014

(54) IMAGE PROCESSING APPARATUS, DEVICE COOPERATION SYSTEM, AND RECORDING MEDIUM

(75) Inventors: Sachiko Abe, Kanagawa (JP); Motoyuki Katsumata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 264 days.

(21) Appl. No.: 13/067,145

(22) Filed: May 12, 2011

(65) Prior Publication Data

US 2011/0279842 A1 Nov. 17, 2011

(30) Foreign Application Priority Data

May 14, 2010 (JP) ................................. 2010-112090

(51) Int. Cl.
*G06F 3/12* (2006.01)
*G06K 15/00* (2006.01)
*G06K 9/40* (2006.01)
*G06F 3/01* (2006.01)
*G06F 3/048* (2013.01)

(52) U.S. Cl.
USPC .......... 358/1.13; 358/1.1; 358/1.14; 382/254; 715/702; 715/762; 715/765

(58) Field of Classification Search
None
See application file for complete search history.

(56) References Cited

U.S. PATENT DOCUMENTS

| | | | |
|---|---|---|---|
| 2006/0077444 A1 | 4/2006 | Lum et al. | |
| 2006/0136992 A1 | 6/2006 | Shigeeda | |
| 2007/0109561 A1* | 5/2007 | Suzue | 358/1.1 |
| 2008/0168380 A1 | 7/2008 | Kodimer et al. | |
| 2009/0231353 A1* | 9/2009 | Han | 345/581 |

FOREIGN PATENT DOCUMENTS

| | | | |
|---|---|---|---|
| EP | 1 903 767 | | 3/2008 |
| EP | 1903767 A1 | * | 3/2008 |
| EP | 2 104 328 | | 9/2009 |
| JP | 2003280731 A | | 2/2003 |
| JP | 2003280731 A | | 10/2003 |
| JP | 2006-203858 | | 8/2006 |
| JP | 2007-087398 | | 4/2007 |
| JP | 2009141685 A | | 6/2009 |

OTHER PUBLICATIONS

European Search Report dated Sep. 30, 2011.
Notice of rejection for corresponding Japanese patent application No. 2010-112090 dated Oct. 15, 2013.

* cited by examiner

*Primary Examiner* — Twyler Haskins
*Assistant Examiner* — Henok Shiferaw
(74) *Attorney, Agent, or Firm* — Harness, Dickey & Pierce, P.L.C.

(57) ABSTRACT

An image processing apparatus is connected to an apparatus including a layout data storage unit storing layout data, a display part data storage unit storing part data, and a customization data storage unit storing customization data, the image processing apparatus including a menu construction unit that generates the menu based on at least the part data, a menu generation unit that modifies the menu based on the customization data, a display unit that displays the menu modified based on the customization data and accepts an operation for the display part, and a device cooperation unit that requests the apparatus to provide the function and setting information of the function, the function having been accepted via a second display unit.

16 Claims, 21 Drawing Sheets

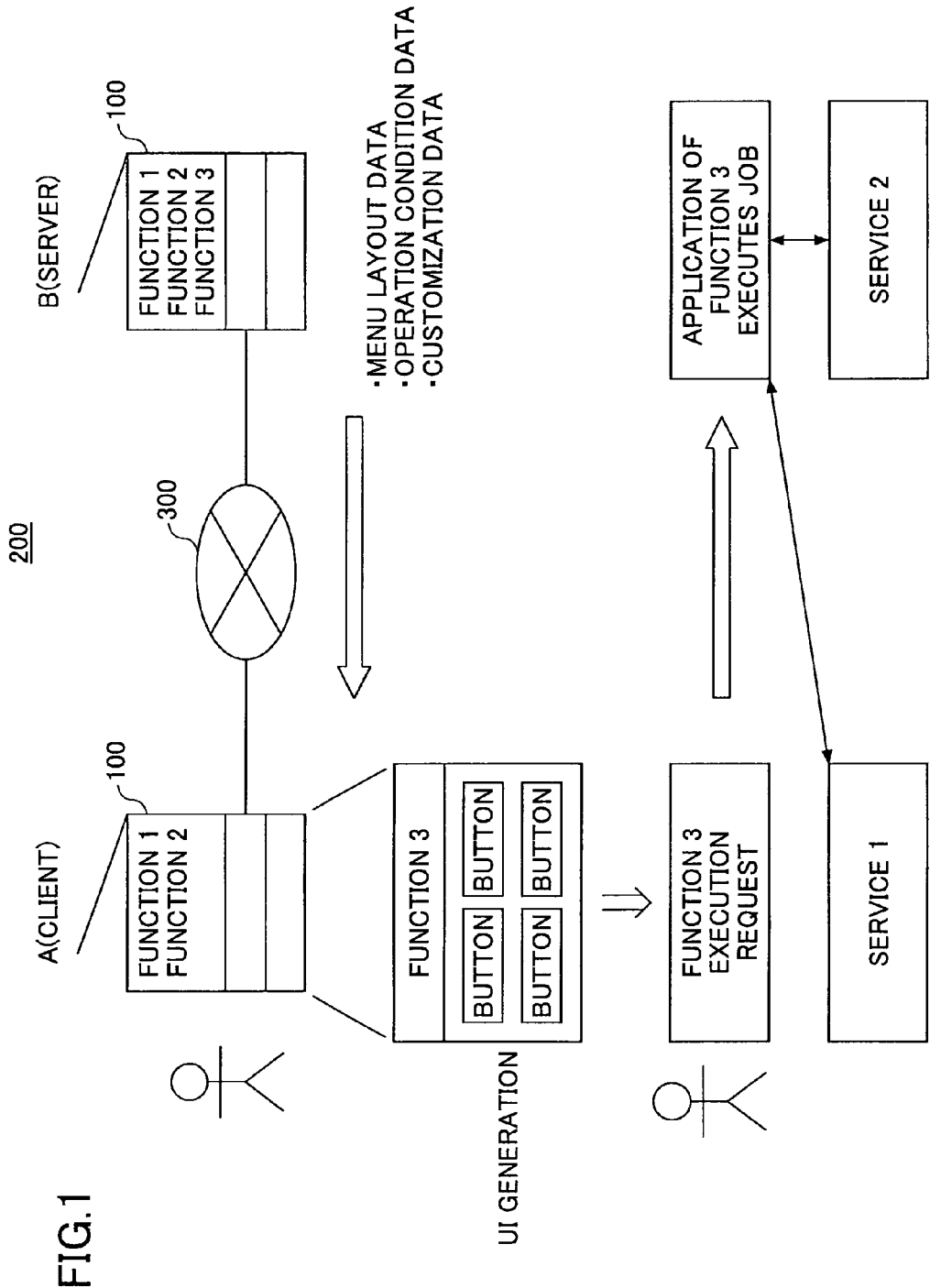

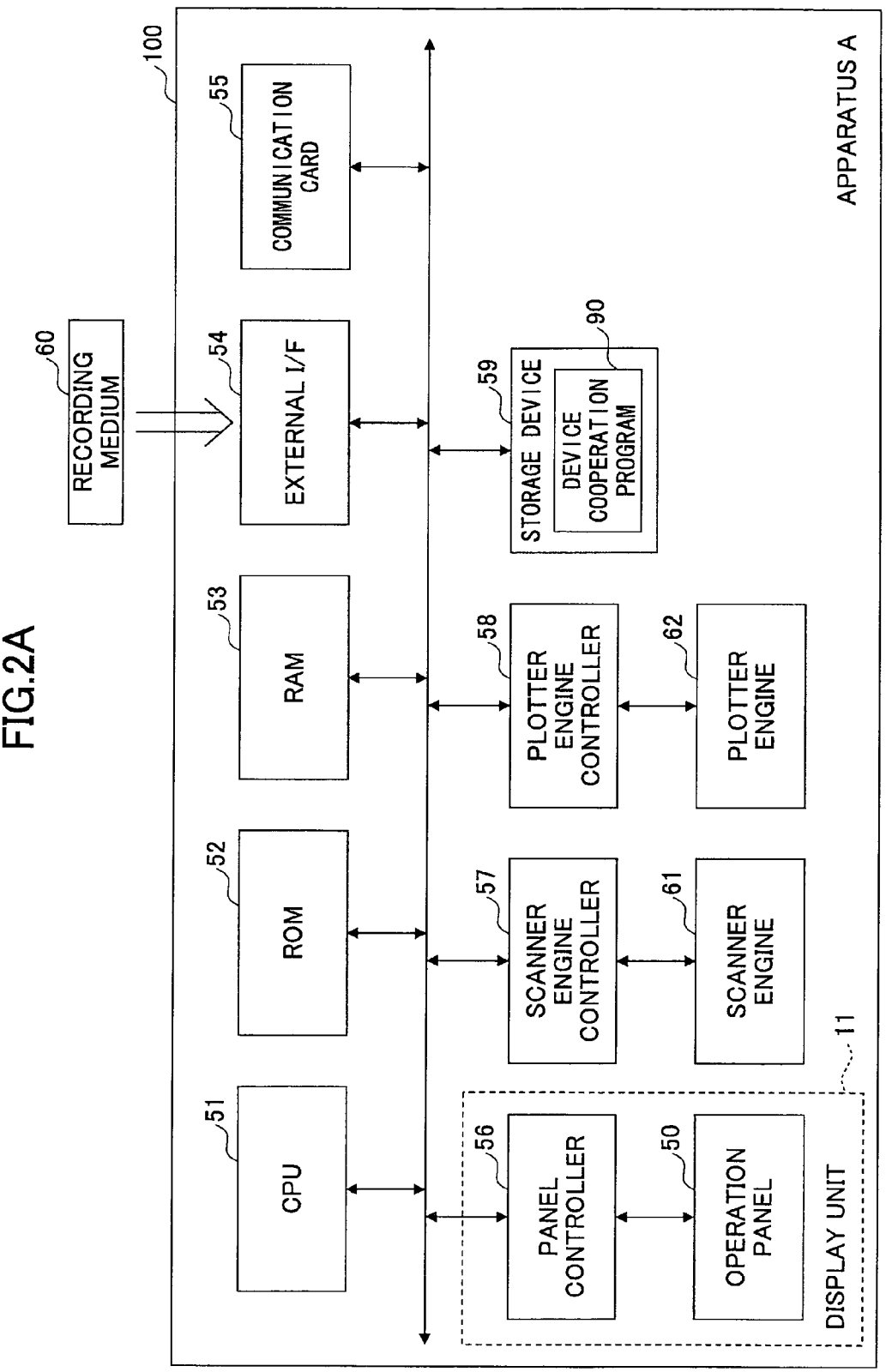

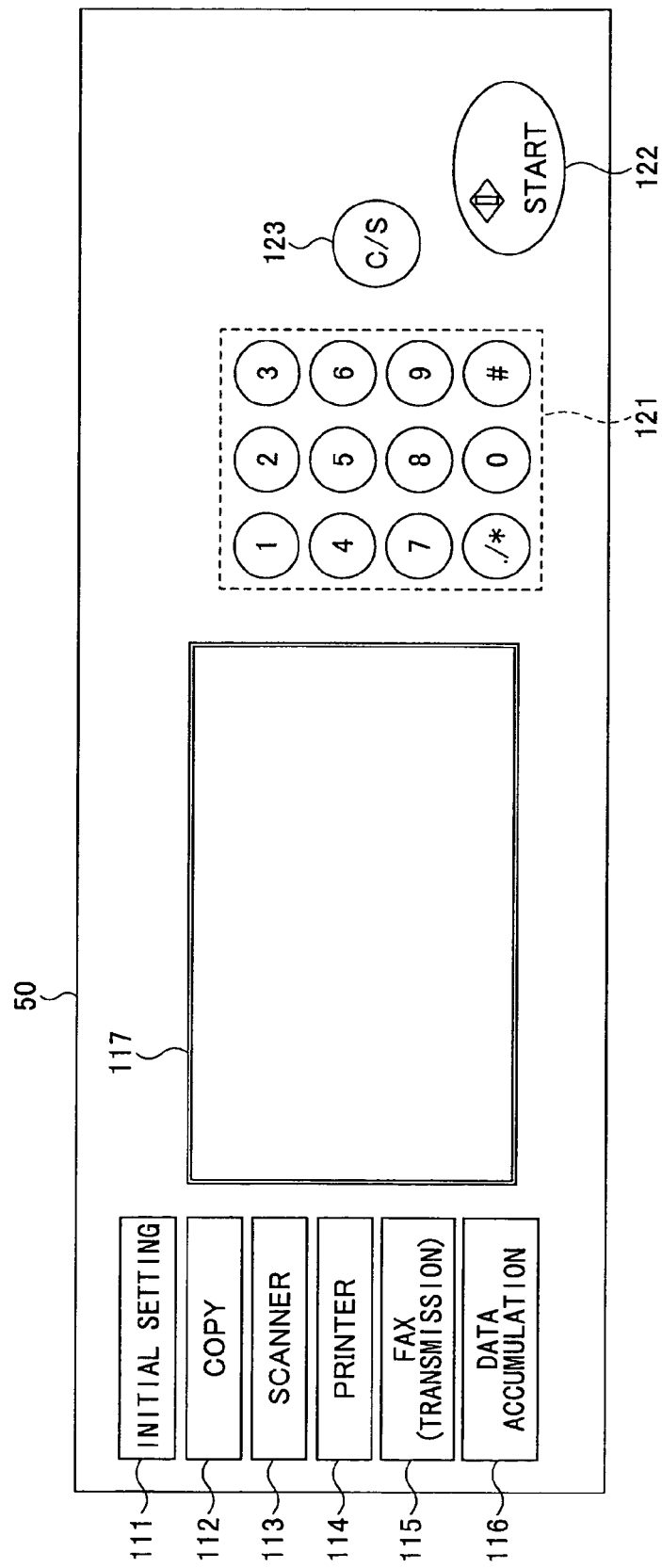

FIG.5

| PART NAME | IMAGE(WVGA) | INITIAL LAYOUT | ASSOCIATION WITH UI |
|---|---|---|---|
| DOCUMENT TYPE | DOCUMENT TYPE: [CHARACTER·PICTURE ▽] | WVGA: (xxx,yyy) | FAX READ SETTING DOCUMENT TYPE |
| DOCUMENT SET DIRECTION | DOCUMENT SET DIRECTION: [R ᴿ ▽] | WVGA: (xxx,yyy) | FAX READ SETTING DOCUMENT SET DIRECTION |
| .. | .. | .. | .. |

FIG.6

| OPERATION CONDITION DATA | | | | | CUSTOMIZATION DATA | | | | | |
|---|---|---|---|---|---|---|---|---|---|---|
| PART NAME | | | | | USER1 | | | USER2 | | |
| APPLICATION NAME (FUNCTION NAME) | OPERATION NAME | ITEM NAME | | SELECTABLE VALUES | SETTING INFORMATION | DISPLAY SWITCH | COORDINATE (WVGA) | USER AUTHORITY | DISPLAY SWITCH | COORDINATE (WVGA) | USER AUTHORITY |
| | | | TYPE | | | | | | | | |
| FAX | READ SETTING | DOCUMENT TYPE | CHOICES (SELECT ONE) | CHARACTER | | ON | (xxx, yyy) | PERMITTED | ON | (xxx, yyy) | NOT PERMITTED |
| | | | | CHARACTER · PICTURE | ● | | | | | | |
| | | | | PICTURE | | | | | | | |
| | | | | LIGHT DRAFT | | | | | | | |
| | | | | MAP | | | | | | | |
| | | DOCUMENT SET DIRECTION | CHOICES (SELECT ONE) | READABLE DIRECTION | ● | ON | (xxx, yyy) | NOT PERMITTED | ON | (xxx, yyy) | NOT PERMITTED |
| | | | | UNREADABLE DIRECTION | | | | | | | |
| | | .. | .. | .. | .. | .. | .. | .. | .. | .. | .. |

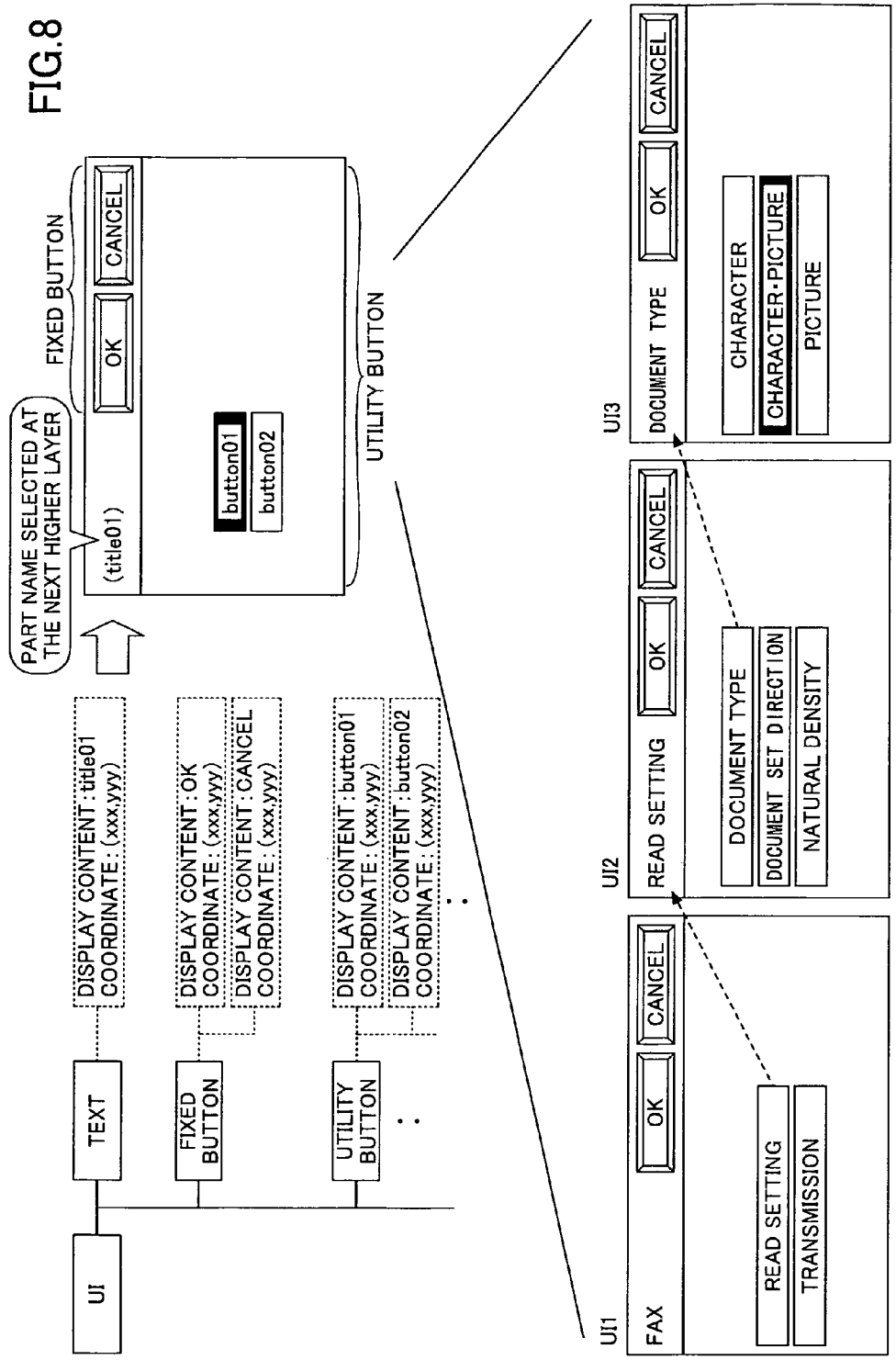

| CUSTOMIZATION DATA | | | |
|---|---|---|---|
| USER1 | OPERATION CONDITION DATA | CUSTOMIZATION DATA | |
| | ITEM NAME | DISPLAY SWITCH | COORDINATE |
| | PICTURE TYPE | ON | (xxx,yyy) |
| | DOCUMENT TYPE | OFF | – |
| | DOCUMENT SET DIRECTION | ON | (xxx,yyy) |
| | NATURAL DENSITY | OFF | – |
| | : | : | : |

FIG.9F

OPERATION CONDITION DATA

| | PART NAME | TYPE | SELECTABLE VALUES |
|---|---|---|---|
| FAX READ SETTING | PICTURE TYPE | SELECT ONE | CHARACTER<br>CHARACTER·PICTURE<br>PICTURE<br>LIGHT DRAFT<br>MAP |
| | DOCUMENT TYPE | SELECT ONE | PRINT DOCUMENT<br>COPY DOCUMENT<br>PRINT PICTURE<br>COPY PICTURE<br>PHOTOGRAPHIC PAPER PICTURE |
| | DOCUMENT SET DIRECTION | SELECT ONE | READABLE DIRECTION<br>UNREADABLE DIRECTION |
| ... | ... | ... | ... |

FIG.9G

4-LINE EXAMPLE

| PICTURE TYPE | ◄ ▶ |
|---|---|
| CHARACTER | |
| CHARACTER·PICTURE | |
| PICTURE | |

| DOCUMENT TYPE | ◄ ▶ |
|---|---|
| PRINT DOCUMENT | |
| COPY DOCUMENT | |
| PRINT PICTURE | |

WVGA EXAMPLE

READY TO TRANSMIT

| PICTURE TYPE | | | ALL DESTI-NATIONS | | | |
| --- | --- | --- | --- | --- | --- | --- |
| DOCUMENT TYPE | | | | | FAX SETTING | SCANNER SETTING |
| DOCUMENT DIRECTION | | | | | COMMON SETTING | |

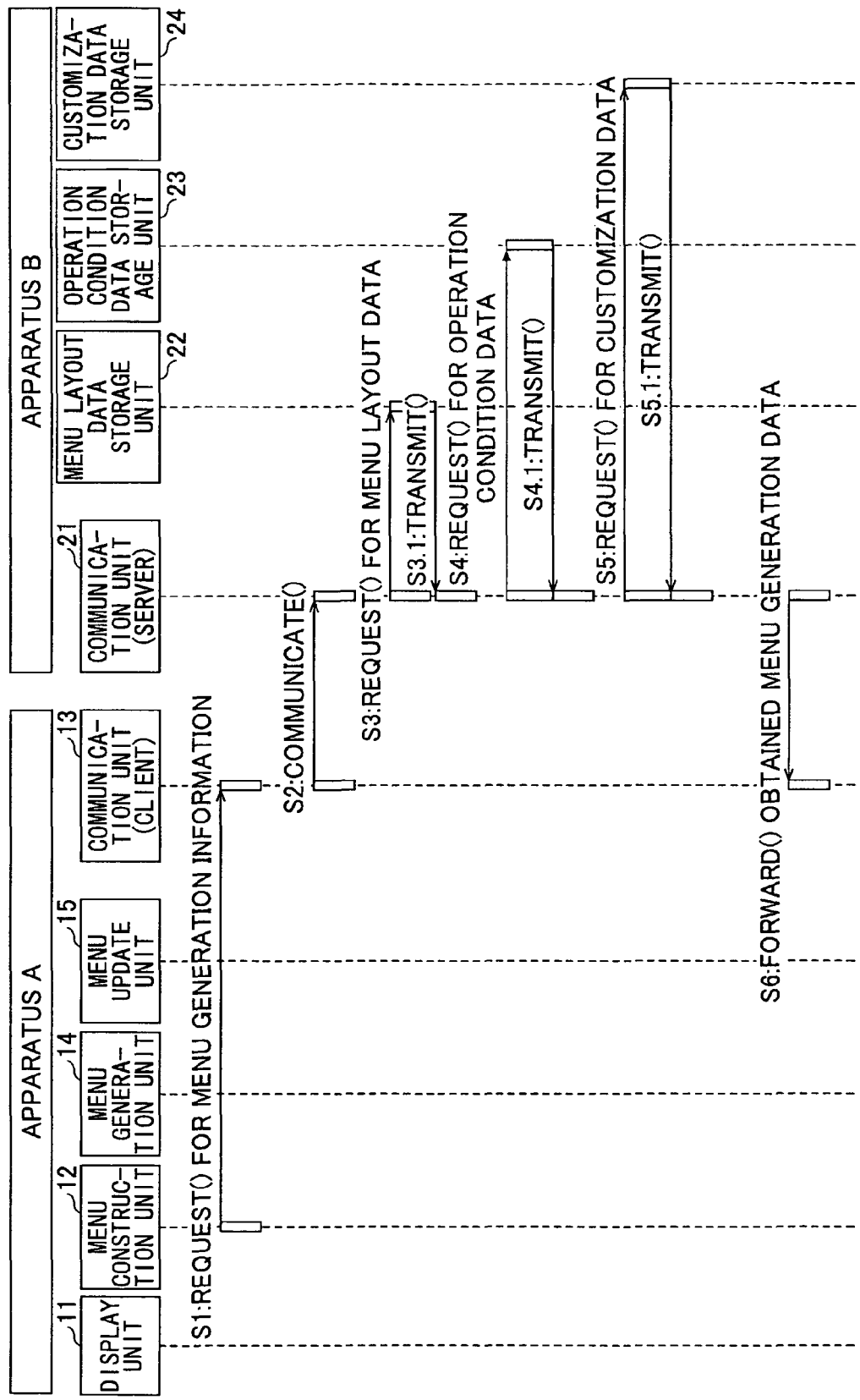

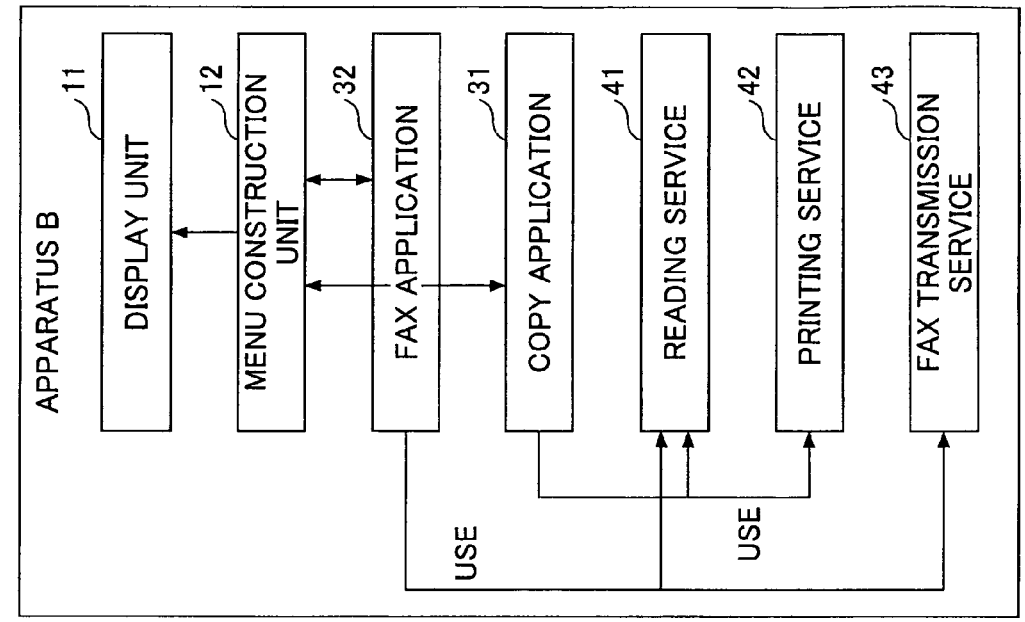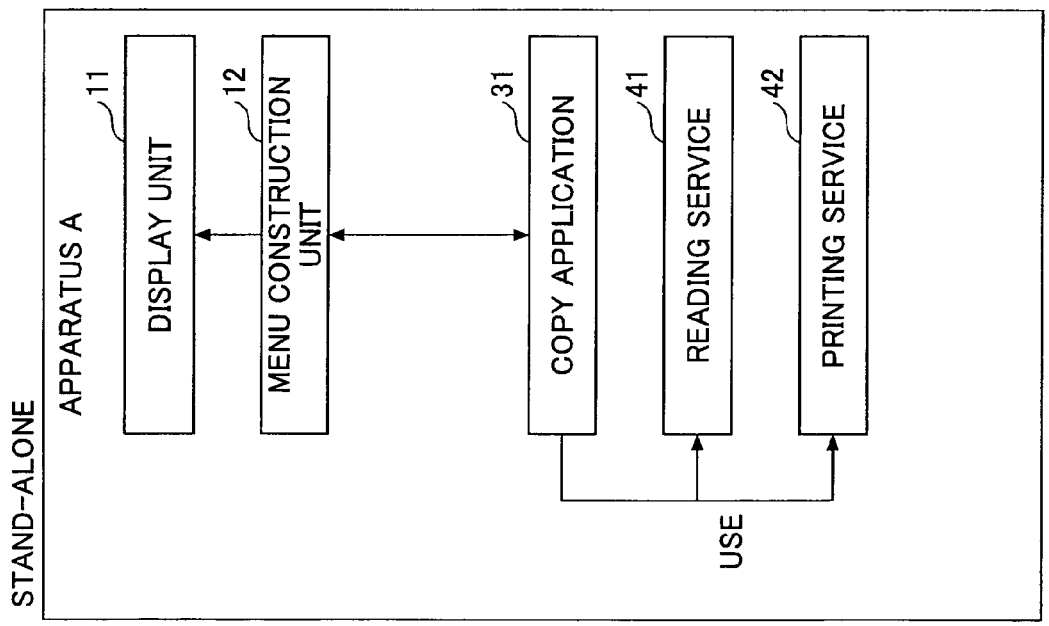
FIG.11

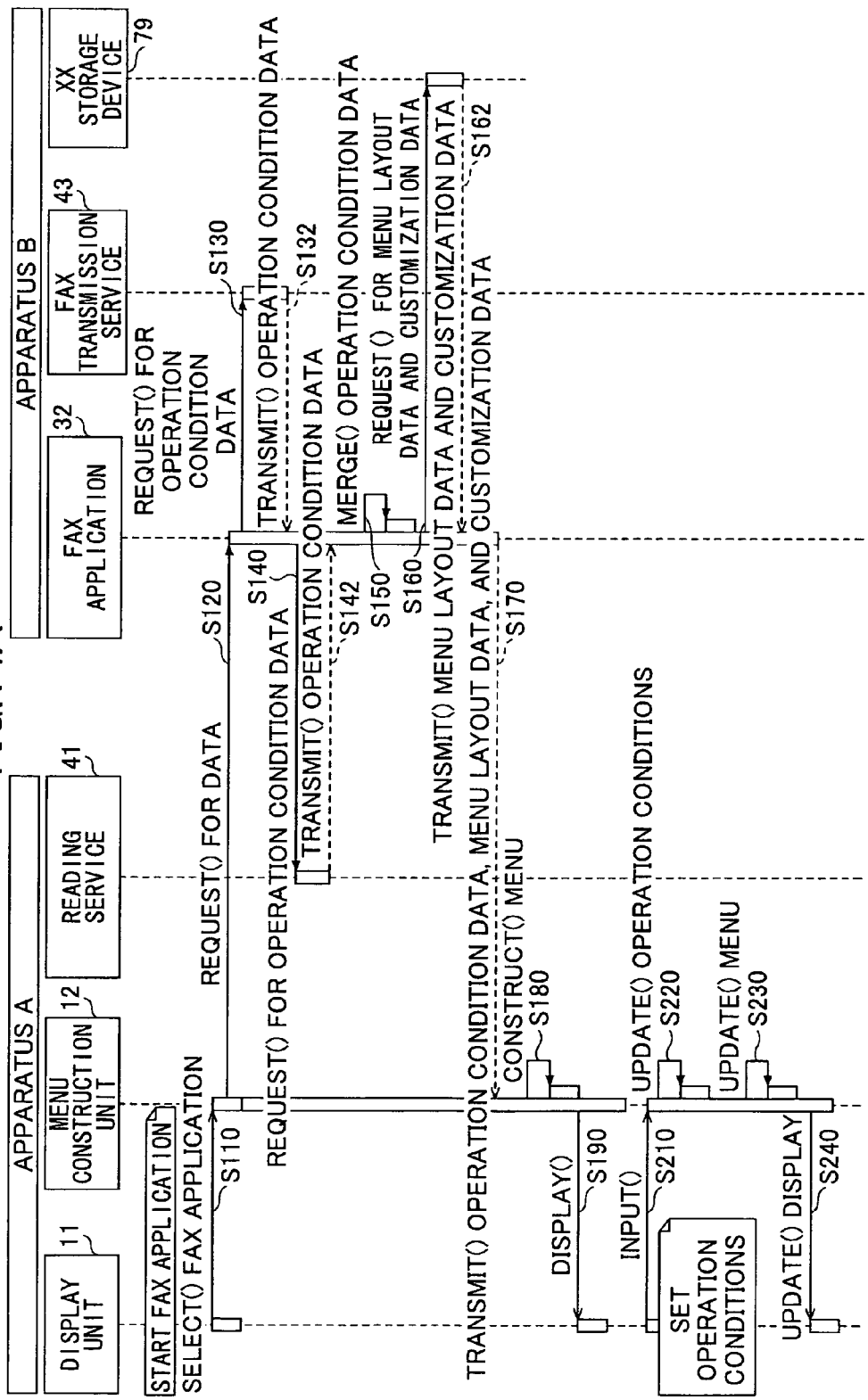

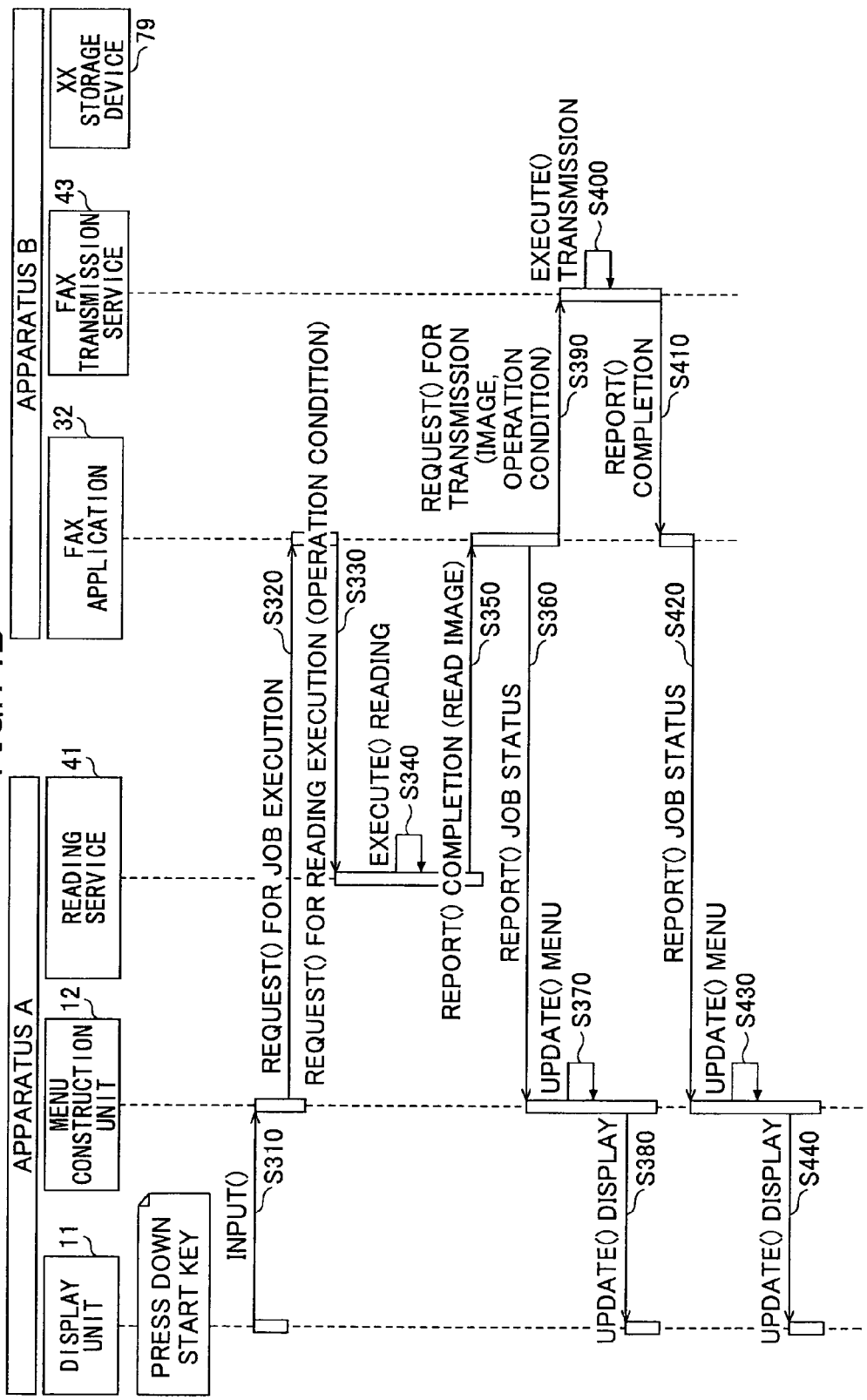

IMAGE PROCESSING APPARATUS, DEVICE COOPERATION SYSTEM, AND RECORDING MEDIUM

CROSS-REFERENCE TO RELATED APPLICATIONS

The present application claims priority under 35 U.S.C §119 to Japanese Patent Application No. 2010-112090 filed May 14, 2010, the entire contents of which are hereby incorporated herein by reference.

BACKGROUND OF THE INVENTION

1. Field of the Invention

The present invention generally relates to a device cooperation system where first and second devices cooperate together, and more particularly to an image processing apparatus, a device cooperation system, a service providing method, and a recording medium where one device provides information to the other device, the information being necessary for generating UI (User Interface).

2. Description of the Related Art

There are various office apparatuses such as printers and copier installed in offices. However, there may be a case where even in the same kind of the office apparatuses, operable functions may differ among the office apparatuses. For example, a user who operates an office apparatus A cannot use a function "b" which is not available in the office apparatus A. But if the user goes to an office apparatus B that has the function "b", the user may use the function "b".

There are many cases where those office apparatuses are connected to each other via a network. Therefore, to improve the convenience for the users, it is thought to provide a technique that allows a user to the function "b" of the office apparatus B by operating the office apparatus A. However, since the office apparatus A does not have the function "b" in the first place, the office apparatus A does not include the UI (User Interface) to use (operate) the function "b" of the office apparatus B.

To overcome the inconvenience, there has been known a technique to provide a UI so that a user operating an apparatus can use another apparatus (see, for example, Japanese Patent Application Publication No. 2003-280731, hereinafter "Patent Document 1"). Patent Document 1 discloses a system in which a status of a target apparatus to be controlled is stored in a server in advance, and when a control apparatus transmits a request for receiving definition data of the UI of the target apparatus to the server, the server transmits the definition data to the control apparatus, so that the control apparatus may provide (display) the UI of the target device based on the definition data.

However, in the system disclosed by Patent Document 1, it may be possible for the control apparatus to display the UI to operate the target apparatus, but a common UI is always displayed regardless of the users. Namely, even when a user customizes the UI of the target apparatus beforehand, it is not possible to display the customized UI on the control apparatus.

Further, in Patent Document 1, there is another problem that no consideration has been made about the difference of the display capability between the apparatuses (i.e., the control apparatus and the target apparatus). Among the apparatuses having different functions, the display capability may differ. Therefore, without the consideration of the difference of the display capabilities of the apparatuses, the user operability may be degraded.

SUMMARY OF THE INVENTION

The present invention is made in light of the above circumstances, and may provide an image processing apparatus, a device cooperation system, a service providing method, and a recording medium capable of improving user operability when a user operates one apparatus to control another apparatus.

According to an aspect of the present invention, there is provided an image processing apparatus to be connected to an apparatus including a first display unit displaying a menu to accept user's operation, a layout data storage unit storing layout data of a display part that is to be displayed on the menu, a display part data storage unit storing part data where a part name of the display part is registered in accordance with a hierarchical structure of the menu, and a customization data storage unit storing customization data and user ID, the customization data being associated with user ID and indicating whether the display part is to be displayed or a display manner of the display part. The image processing apparatus includes a receiving unit that receives the layout data, the part data, and the customization data for the menu to provide a function of the apparatus, a menu construction unit that generates the menu based on at least the part data, a menu generation unit that modifies the menu based on the customization data, the menu having been generated by the menu construction unit, a second display unit that displays the menu modified based on the customization data and accepts an operation for the display part, and a device cooperation unit that requests the apparatus to provide the function and setting information of the function, the function having been accepted via the second display unit.

By having the configuration described above, it may become possible to improve user operability when a user operates an apparatus to control another apparatus.

BRIEF DESCRIPTION OF THE DRAWINGS

Other objects, features, and advantages of the present invention will become more apparent from the following description when read in conjunction with the accompanying drawings, in which:

FIG. 1 is a schematic drawing illustrating a scheme of a device cooperation system;

FIGS. 2A and 2B illustrate exemplary hardware configurations of apparatuses A and B, respectively;

FIG. 3 is a drawing illustrating an example of an operation panel;

FIG. 5 is a schematic drawing illustrating an example of menu layout data;

FIG. 6 is a drawing illustrating an example where operation condition data are associated with customization data;

FIG. 8 is a drawing illustrating another example of the UI of the apparatus A;

FIGS. 9B through 9G are drawings illustrating steps of FIG. 9A;

FIGS. 10A and 10B are sequential diagrams illustrating a procedure of device cooperation between the apparatuses A and B;

FIG. 11 is a schematic drawing illustrating an example of applications and services;

FIGS. 14A and 14B are sequential diagrams illustrating a procedure from reading a document to fax transmission using services.

DETAILED DESCRIPTION OF THE PREFERRED EMBODIMENTS

Figure 2B:
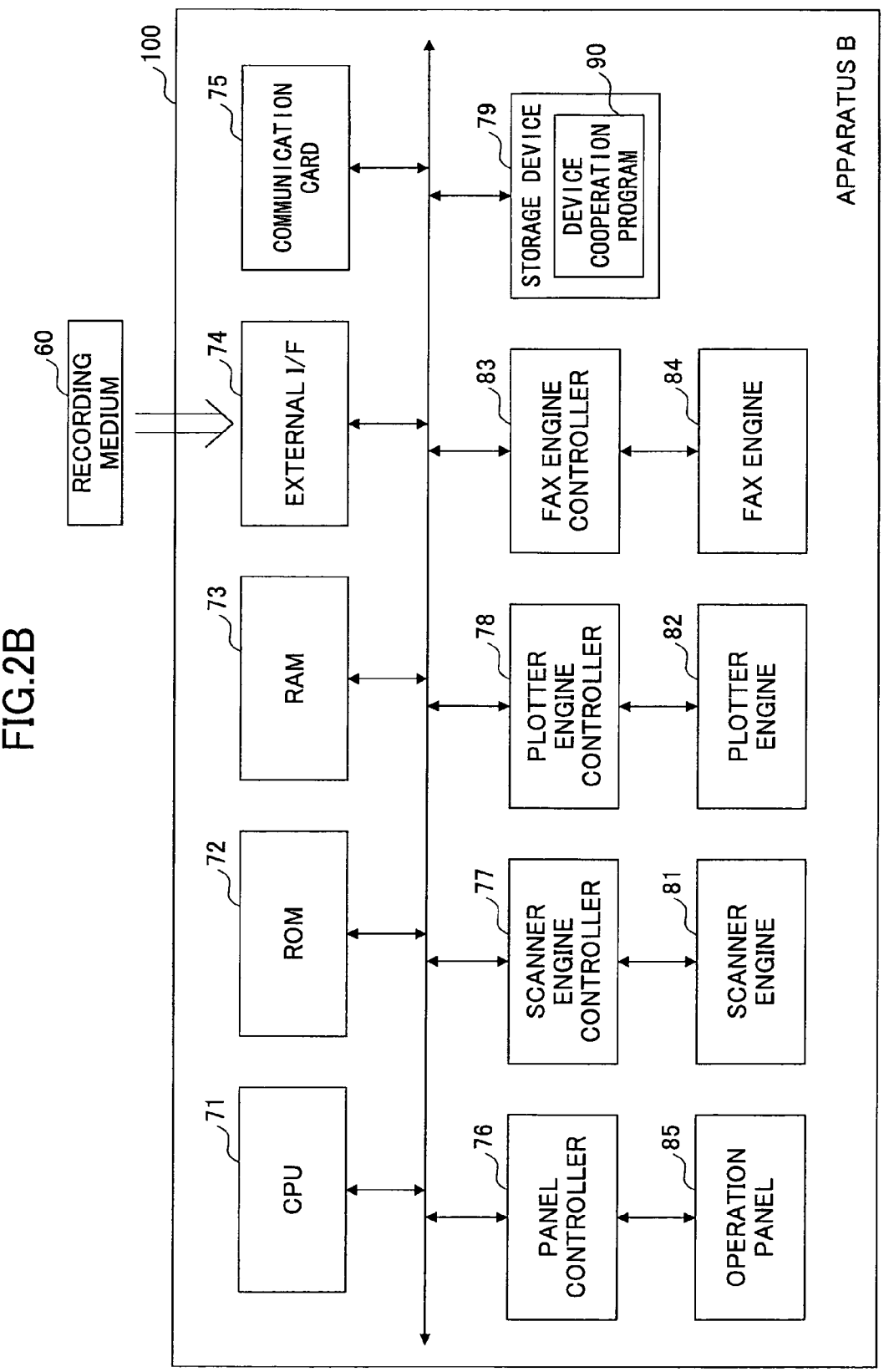

In the following, embodiments to carry out the present invention are described with reference to the accompanying drawings.

Outline of Device Cooperation System 200 According to an Embodiment of the Present Invention FIG. 1 schematically illustrates an example of a device cooperation system 200 according to an embodiment of the present invention. As illustrated in FIG. 1, an apparatus B includes, for example, functions 1 through 3, and stores menu layout data defining a design of a UI (User Interface) for each of the functions. The apparatus B further stores operation condition data including part information of soft keys (hereinafter referred to as "buttons") to be displayed on the UI and the current selected status of the buttons.

Further, a user may use any of the apparatuses A and B, and it is assumed that the user has already operated the apparatus B and has customized the UI for operating the apparatus B. Accordingly, it is assumed that the apparatus B further stores customization data for the user (each of the users).

On the other hand, an apparatus A includes the functions 1 and 2, but does not include the function 3. In such a case, both apparatuses A and B include a device cooperation function that allows, for example, the apparatus A to use the function 3 of the apparatus B. When a user uses the device cooperation function of the apparatus A, the three types of data (i.e., the menu layout data, the operation condition data, and the customization data) are transmitted from the apparatus B to the apparatus A. Hereinafter those three types of data (i.e., the menu layout data, the operation condition data, and the customization data) may be collectively called menu generation information.

Based on the menu layout data and the customization data, the apparatus A generates the UI. Then, the apparatus A modifies the UI by applying the operation condition data to the UI. Due to the modification, a customization result by the user on the apparatus B may be reflected into the UI on the apparatus A, thereby enabling improving the operability for the user.

Further, when the panel type of the apparatus A is the same as that of the apparatus B, it is possible to make (duplicate) the UI of the apparatus A substantially the same as the UI of the apparatus B. However, as described below, according to an embodiment of the present invention, even when the panel type of the apparatus A differs from the panel type of the apparatus B, it may become possible to reflect the customization result on the apparatus B into the UI on the apparatus A.

Because of this feature, it may become possible for the user to use the function 3 not only on the apparatus B but also on the apparatus A with operability similar to that on the apparatus B. In the following, because of such a utility form described above, the apparatuses A and B may be herein called a client and a server, respectively.

In this example, the user inputs settings allowable (settable) for the function 3 via the UI on the apparatus A, and sends a request for executing the function 3 to the apparatus B. The apparatus B starts the application corresponding to the function 3 and executes a job corresponding to the function 3. The functions of the apparatuses A and B execute the jobs using services. Specifically, the function 3 executes the job of the function 3 by using, for example, the service 1 of the apparatus A and the service 2 of the apparatus B.

As described above, by providing the UI of the function 3 to the apparatus B, it may become possible for the apparatus A having no function 3 to use the function 3 without greatly influencing the execution of the services and jobs of the apparatuses A and B.

Configurations of Apparatuses

FIGS. 2A and 2B illustrate exemplary hardware configurations of apparatuses A and B, respectively. The apparatus A may be a printer, a copier, or an MFP (Multi Function Peripheral), and may be collectively called an image forming apparatus 100. This may also be applied to the apparatus B. However, according to this embodiment, since the apparatus B includes a FAX transmission/receiving function which is not included in the apparatus A, the apparatus B may be called an image forming apparatus 100 including a facsimile machine.

As illustrated in FIG. 2A, the apparatus A includes a CPU (Central Processing Unit) 51, a ROM (Read Only Memory) 52, a RAM (Random Access Memory) 53, an external I/F (Interface) 54, a communication card 55, a panel controller 56, a scanner engine controller 57, a plotter engine controller 58, and a storage device 59, which are connected to each other via an internal bus.

The CPU 51 performs the control of the entire apparatus A by executing a program stored in the storage device 59 or the ROM 52 by using the RAM 53 as a working memory. The external I/F 54 is provided to be used to connect a USB cable, a recording medium 60 and the like. The recording medium 60 includes, for example, a flash memory such as a USB memory, and an optical storage medium such as a CD-ROM.

The communication card 55 may be called a LAN (Local Area Network) card or the Ethernet (registered trademark) card and transmits packet data set to the apparatus B via a network 300 (see FIG. 1) based on the instructions from the CPU 51, and receives packet data sent from the apparatus B.

The panel controller 56 causes an operation panel 50 to display the UI and receives operations performed on the UI buttons and the hardware keys. The operation panel 50 is described below. The scanner engine controller 57 receives reading conditions such as resolution data set on the operation panel 50 by a user, and controls a scanner engine 61 based on the reading conditions. The scanner engine 61 optically scans a document placed on a contact glass and performs A/D conversion and image processing on the reflected light to generate digital data having a predetermined resolution (hereinafter, the digital data are referred to as image data). The plotter engine controller 58 receives printing conditions such as the number of sheets to be printed set via the operation panel 50, and controls a plotter engine 62 based on the printing conditions. The plotter engine 62 includes, for example, tandem-type photosensitive drums, modulates a laser beam based on the image data or print job data received from a PC (Personal Computer), and scans the modulated laser beam onto the photosensitive drums to form an latent image. The latent image is developed by adhering toner and is transferred onto a sheet one by one and fixed by heating and pressing the images.

The storage device 59 is rewritable non-volatile memory such as an HDD (Hard Disk Drive), a flash memory or the like. In the storage device 59, an application program to be executed by the CPU 51, font data, the image data and the print job data are stored. Further, a device cooperation program 90 for providing the device cooperation function is also stored in the storage device 59. The device cooperation program 90 may be stored before shipment. Alternatively, after shipment, the device cooperation program 90 may be provided (stored) in the recording medium 60 or distributed from a server (not shown) via the network 300 to be installed into the storage device 59. Further, the device cooperation program 90 may be appropriately updated to a new version.

Further, in this embodiment, the functions of the apparatuses A and B are synonymous with the applications, which include a printer application, a copier application, a scanner application, a FAX machine application, a data accumulation application and the like.

FIG. 3 illustrates an example of the operation panel 50. There may be a case where the operation panel of the apparatus A differs from the operation panel of the apparatus B. Herein, the operation panel 50 of the apparatus A is described. As illustrated in FIG. 3, the operation panel 50 includes fixed hardware keys including an initial setting key 111, a copy key 112, a scanner key 113, a printer key 114, a FAX key 115, a data accumulation key 116, ten keys 121, a clear/stop key 123, and a start key 122 and an LCD (Liquid Crystal Display) section 117.

The LCD section 117 includes an integrated touch panel, on which the buttons corresponding to the UI may be formed (displayed). The display scheme of the LCD section 117 is not limited to liquid crystal. For example, an organic EL display may alternatively used.

The initial setting key 111 is used for users to turn ON or OFF (i.e., display or not) the icon of the UIs for each of the applications, to activate or deactivate an authentication function, and to perform various other settings. The copy key 112, the scanner key 113, the printer key 114, the FAX key 115, and the data accumulation key 116 are used to switch (select) the applications. The ten keys 121 are used for a user to input the number of sheets to be printed, a FAX number and an e-mail address as destinations and the like. The clear/stop key 123 is used, for example, to cancel the input number and stop reading or printing. The start key 122 is used to, for example, execute to copy or start FAX transmission.

Referring back to FIG. 2B, the apparatus B includes a CPU 71, a ROM 72, a RAM 73, an external I/F 74, a communication card 75, a panel controller 76, a scanner engine controller 77, a plotter engine controller 78, a FAX engine controller 83 and storage device 79, which are connected to each other via an internal bus. In FIG. 2B, the same names are used for the elements same as those in FIG. 2A, and the description thereof may be omitted.

The configuration of the apparatus B is the same as the configuration of the apparatus A except that, as described above, the apparatus B includes the FAX engine controller 83 and a FAX engine 84 (which are not included in the apparatus A). The FAX engine controller 83 receives transmission conditions such as the destination (e.g., the FAX number and the e-mail address) set by a user, and controls the FAX engine 84 based on the transmission conditions. The FAX engine 84 connects to the network 300 via the communication card 75 to further connect to a public communication network using a communication protocol corresponding to, for example, T.37 or T38 standard or an NCU (Network Control Unit), so as to transmit and receive the image data in accordance with a protocol corresponding to, for example, G3 or G4 standard. Further, when the image data are received while the apparatus B is tuned OFF, the FAX engine 84 may start a plotter engine 82 to print the image data onto a sheet.

Further, the device cooperation program 90 is installed in the storage device 79 of the apparatus B as well. The device cooperation program 90 installed in the apparatus B is the same as the device cooperation program 90 installed in the apparatus A. Therefore, it is also possible to use a function of the apparatus A from the apparatus B.

Apparatus B

Next, the functional block diagram of the apparatuses A and B is described.

Figure 4:
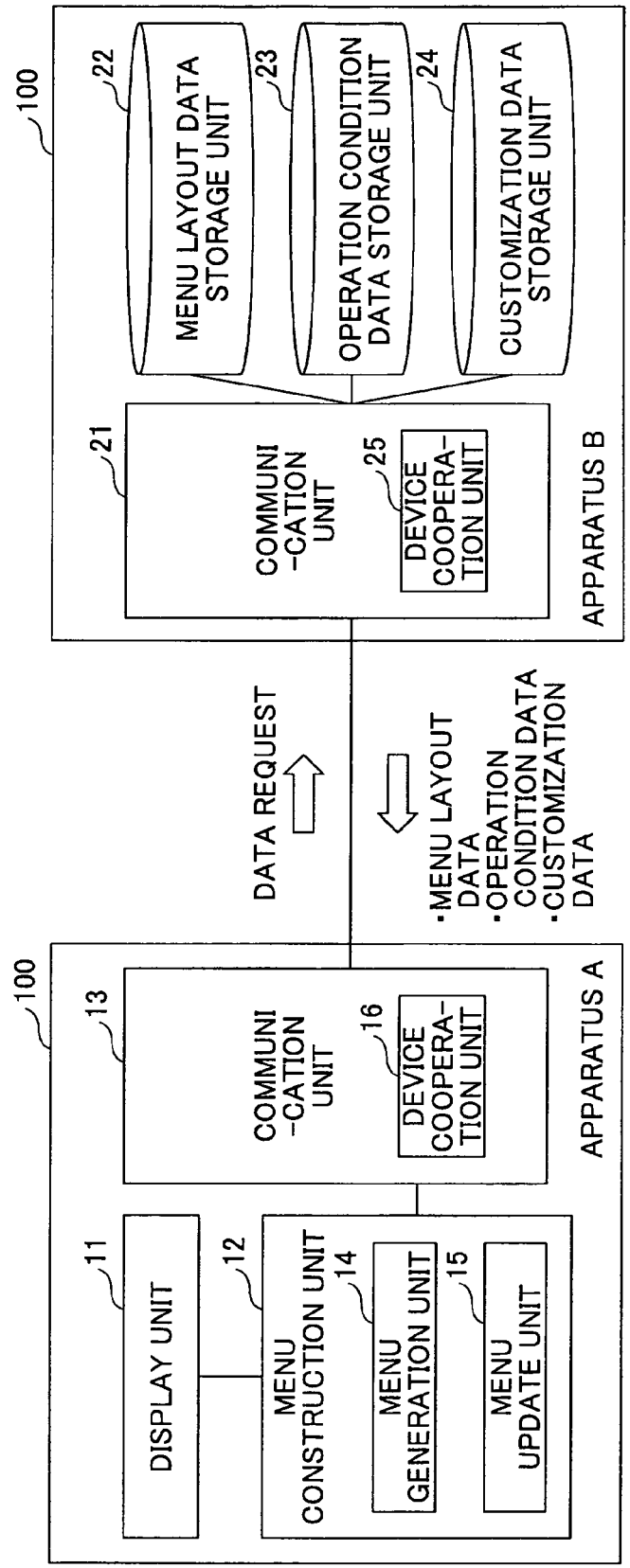
FIG. 4 is an exemplary block diagram of the apparatuses A and B.

FIG. 4 is an exemplary block diagram of the apparatuses A and B. As described above the apparatuses A and B are connected to each other so as to provide (perform) the device cooperation function. In most cases, the apparatuses A and B are connected to each other via a network 300 such as a LAN or a WAN (Wide Area Network). However, the apparatuses A and B may be connected directly to each other. Further, the apparatuses A and B may be connected wirelessly to each other or may be connected based on wired connection to each other. Further, the apparatus A and apparatus B are not prevented from being distributed (sold) as a stand-alone apparatus because apparatuses A and B include the device cooperation function. Namely, the apparatuses A and B can be distributed as a stand-alone apparatus or as a combined system.

As illustrated in FIG. 4, the apparatus B includes a communication unit 21, a menu layout data storage unit 22, an operation condition data storage unit 23, and a customization data storage unit 24. As the communication unit 21, in fact, there are provided the device cooperation program 90 and the communication card 75. The communication unit 21 transmits the menu layout data, the operation condition data, and the customization data to the apparatus A.

Further, as illustrated in FIG. 4, the apparatus A includes a device cooperation unit 16 that is realized by executing the device cooperation program 90 by the CPU 51. Similarly, the apparatus B includes a device cooperation unit 25 that is realized by executing the device cooperation program 90 by the CPU 71. The device cooperation units 16 and 25 are in communication with each other, so that, for example, the apparatus A can use a function of apparatus B.

Menu Layout Data Storage Unit 22

As the menu layout data storage unit 22, for example, the storage device 79 may be used. The menu layout data storage unit 22 may be a non-volatile memory storing the menu layout data. Herein, the menu layout data refer to information items specifying (determining) the image (exterior appearance) and the layout position of the UI of the part that is not included (common) in all of the applications from among the parts to be disposed (displayed) in the UI. This is because when the part is included (common) in all of the applications, and if the apparatus A includes at least one application, the menu layout data of the part included (common) in all of the applications should be included in the apparatus A. Therefore, it is not necessary to transmit the menu layout data of such a part from the apparatus B to the apparatus A. For example, an OK button or a help button is one of the parts included (common) in all of the applications.

FIG. 5 schematically illustrates an example of the menu layout data: As illustrated in FIG. 5, the menu layout data include information items (data) indicating "image", "initial layout", and "association with UI" which are corresponding to a "part name". The part of the "part name" refers to a button, icon, text, symbol or the like that is operated by a user. In this example of FIG. 5, for identification purposes, there are described (provided) "document type" and "document setting direction" as the "part name". However, practically, as the data of the "part name", ID which do not overlap with other ID may be solely used or the ID and the corresponding "part name" may be used (stored) together.

The "image" refers to the data formed by visualizing process contents or a process target using a small picture or a symbol, the process of the process contents and the process target corresponding to the part. For explanatory purposes, FIG. 5 illustrates a visualized image as the data of the "image". However, practically, electronic data, for example, in Gif, Tiff, or Bmp format are stored in the menu layout data storage unit 22 as the data of the "image".

The "initial layout" refers to the information item indicating an initial position of the part in the UI. For example, by using the upper left corner of the LCD section 117 as the original point, the position in pixel data (i.e., coordinate position) of the upper left corner of the part is registered as the data of the "initial layout". The term "WVGA" in FIG. 5 refers to an example of the resolution of the LCD section 117 having 800×480 pixels. When the resolution changes, the position of the part changes on the UI even if the "initial layout" is unchanged. Because of this feature, the "initial layout" is stored along with the resolution data (e.g., "WGVA").

In FIG. 5, as the data of the "image", character data of "Character■Picture" corresponding to the data of the "image" are displayed. By doing in this way, characters or a symbol may be usually used as the data of the "image", so that a user can recognize the contents of the "image" easily. In some cases, the "image" may include both a character and a symbol together. On the other hand, for designing purposes or the like, there are many cases where the "image" and a character or a symbol may be separately treated in the apparatuses A and B. The characters and the symbol corresponds to the "part name" of the operation condition data. In order to associate the image with the part name, the data "association with UI" becomes necessary to use.

The "association with UI" refers to data that associates the part with the hierarchy (hierarchy level) of the UI. Namely, the name of the application (application name) where the part is to be displayed and the UI where the part is to be displayed when one application includes plural UIs are registered as the data of the "association with UI". In FIG. 5, the part having the part name "Document type" is associated with the UI called "read setting" in the application called "FAX" (i.e., FAX application).

Further, as the data of the application name, practically, an ID which does not overlap with other IDs may be solely used or the ID and the corresponding "application names" may be used together. Similarly, as the data of the part name, practically, an ID which do not overlap with other IDs may be solely used or the ID and the corresponding "part names" may be used together.

In this embodiment, each user may customize the display position of the parts illustrated in the "initial layout" and whether the part is displayed (to that end, "display switch" described below is used). Further, it should be understood that the above customization is merely one example of the customization. For example, the user may make the "image" of the part customizable.

Operation Condition Data Storage Unit 23

As the operation condition data storage unit 23, for example, the storage device 79 may be used. The menu layout data storage unit 22 may be a non-volatile memory storing the menu layout data. Herein, the operation condition data refer to the current or default setting information of the part name and the part to be displayed in the UIs displayed in accordance to a predetermined hierarchy structure.

FIG. 6 illustrates an example of the association (relationships) between the operation condition data and the customization data. As illustrated with reference to FIG. 5, the menu layout data correspond to the operation condition data using the part name of the part. The part name has a hierarchy structure, and for convenience, a name (hierarchy name) is given to each of the hierarchies (hierarchy layers). The names (hierarchy names) in FIG. 6 are "application name", "operation name", "item name", and "selectable value". In FIG. 6, the part names corresponding to the hierarchies are "FAX", "read setting", "document type", "characters" . . . or "FAX", "read setting", "document set direction", "readable direction" . . . in the order from the shallower (lesser) depth to the deeper (greater) depth in the hierarchy structure. Those part names are displayed as the buttons or tabs in the UI.

Further, the term "type" refers to an operation method, and the term "choices (select one)" indicates that a user may select only one choice from the choices of the "selectable values". The "selectable values" of the item name "document type" includes "characters", "characters■picture", "picture", "light draft", and "map". On the other hand, the "selectable values" of the item name "document set direction" includes "readable direction" and "unreadable direction".

Further, there may be a case where in an application such as the "FAX application" where the destination needs to be set, user information is registered in the apparatus B in advance so as to perform the FAX transmission simply by selecting the destination. Therefore, when the apparatus B stores the user information, the user information is transmitted from the apparatus B to the apparatus A as the operation condition data. As the user information, for example, the user name, the FAX number, and the e-mail address are registered.

Customization Data Storage Unit 24

As the customization data storage unit 24, for example, the storage device 79 may be used. The customization data storage unit 24 may be a non-volatile memory storing the customization data. The customization data refers to display mode information of the parts registered for each of the users.

In FIG. 6, as the customization data, for each of the user IDs (user 1, user 2, . . . ), the items "display switch", "coordinate" in WVGA resolution, and "user authority" are registered. When the data of the "display switch" is "ON", the part is set to be displayed.

The "user authority" represents the strength of the authority of the user. Specifically, the "user authority" is the information indicating whether the display of the part is permitted for a logged-in user. Namely, the apparatus A reads the user authority of the logged-in user from the customization data, and can prevent the part having "NO" user authority data from being displayed. By using this, for example, it may become possible to register "NO" as the "user authority" data for outsiders, so as to prevent the users of the apparatus A from transmitting a FAX to the outsiders.

Apparatus A

Referring back to FIG. 4, the apparatus A includes a display unit 11, a menu construction unit 12, and a communication unit 13. The menu construction unit 12 includes a menu generation unit 14 and a menu update unit 15. Further, the apparatus A also displays the UI of the functions that can be provided (i.e., applications that can be executed) by the apparatus A. Therefore, the apparatus A stores the menu layout data of the executable applications.

As the communication unit 13, in fact, there are provided the device cooperation program 90 and the communication card 55. The communication unit 13 transmits data requesting menu generation information to the apparatus B, and further transmits the image data of the document read by the apparatus A to the apparatus B. As the display unit 11, there are provided the operation panel 50 and the panel controller 56. The display unit 11 displays the UI of the FAX application.

The menu construction unit 12 provides a function realized by executing the device cooperation program 90 by the CPU 51. As described above, the menu construction unit 12 includes two units (i.e., the menu generation unit 14 and the menu update unit 15). The menu construction unit 12 controls a series of a UI generation process.

Menu Generation

The menu generation unit 14 generates UIs based on the menu generation information. Although the menu generation unit 14 generates the UIs based on the menu generation information, the menu generation may be influenced by the physical limitations of the LCD section 117 due to the difference of the resolutions as described above. To avoid the problem, in this embodiment, the apparatus A generates the UI only based on the operation condition data and the customization data without using the menu layout data.

Figure 7:
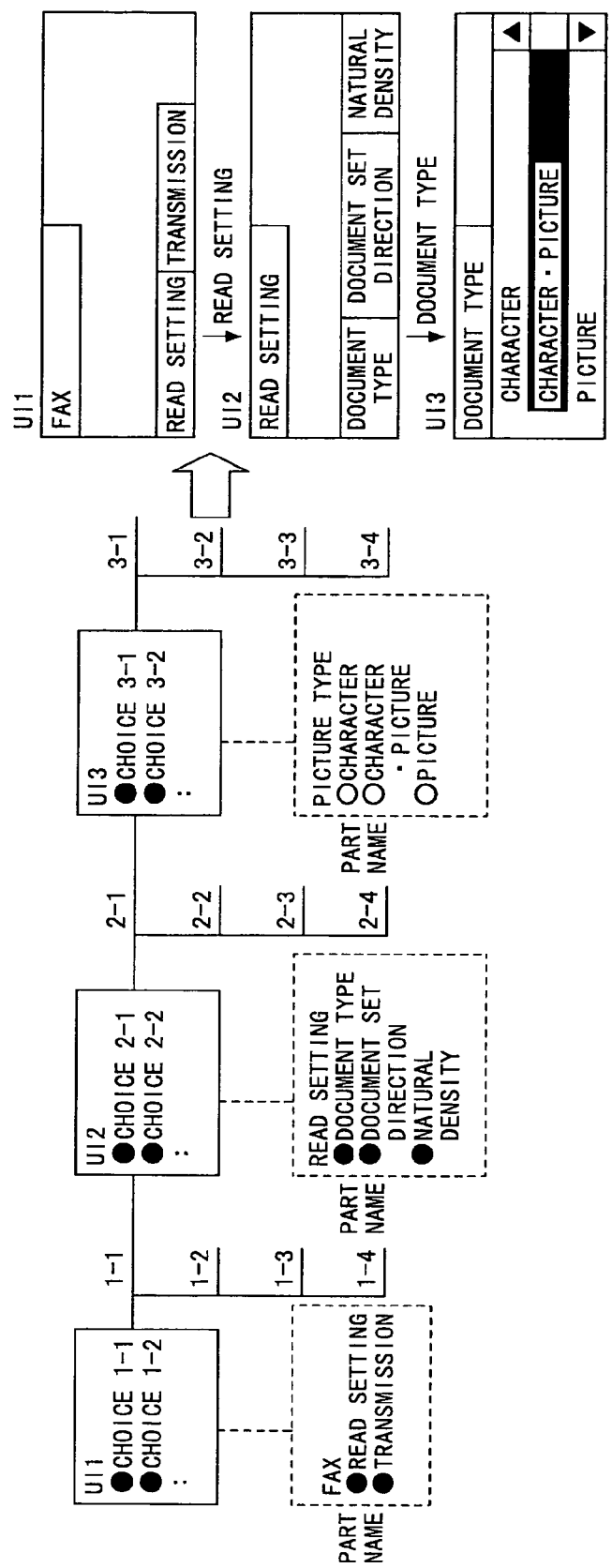
FIG. 7 is a drawing illustrating an example of a UI (User Interface) of the apparatus A.

(1) Display Capacity of LCD Section 117 of Apparatus B>Display Capacity of LCD Section 117 of Apparatus A FIG. 7 illustrates an example of the UI displayed by the apparatus A. In this example, the LCD section 117 of the apparatus A is a line liquid crystal display displaying a character in a dot matrix of one square. In the example of FIG. 7, the line liquid crystal display displays up to four lines (hereinafter a 4-line display device).

On the other hand, when the resolution of the LCD section 117 of the apparatus B is WVGA which can display a GUI (Graphic User Interface), since the menu layout data may be optimized to use the WVGA resolution, the menu generation unit 14 of the apparatus A may not generate the UI of the apparatus A based on the menu layout data of the apparatus B.

To resolve the problem, when the panel type of the apparatus A differs from the panel type of the apparatus B, the menu generation unit 14 first generates a UI group corresponding to the 4-line display device based on the operation condition data. The UI group includes tree-shaped UIs (i.e., UI1, UI2, and UI3) as illustrated in FIG. 7.

The UI1 is the UI at the shallowest (highest) hierarchy (hierarchy layer) in the FAX application. In UI1, the menu generation unit 14 generates the UI where the application name "FAX" in FIG. 6 is displayed in the first line and the operation name "read setting" at the hierarchy level of "operation name" corresponding to the "part name" and the "transmission" (not shown in FIG. 6) are displayed in the fourth line. In FIG. 7, the choices 1-1 and 1-2 correspond to the "read setting" and the "transmission", respectively.

The UI2 is the UI displayed when the "read setting" is selected in UI1. In UI2, the menu generation unit 14 generates the UI where the "read setting" at the hierarchy of the "operation name" (i.e., the parent hierarchy) is displayed in the first line and the "document type" and the "document set direction" at the hierarchy of the "item name" are displayed in the fourth line. In FIG. 7, the choices 2-1 and 2-2 correspond to the "document type" and the "document set direction", respectively.

The UI3 is the UI displayed when the "document type" is selected in UI2. In UI3, the menu generation unit 14 generates the UI where the "document type" at the hierarchy of the "item name" (i.e., the parent hierarchy) is displayed in the first line and the "characters", the "characters■picture", the "picture", the "light draft", and the "map" are disposed in the respective lines. (When scrolling is necessary, a scroll-bar is also displayed.) In FIG. 7, for example, the choices 3-1 and 3-2 correspond to the "characters", and the "characters■picture", respectively.

As illustrated on the right-hand side of FIG. 7, the part to be selected in each of the UIs is displayed on the line. Because of this feature, it may become possible for a user to select a part in the apparatus A from among the parts that can be selected in the apparatus B even when the panel type of the LCD sections 117 of the apparatuses A and B differ from each other. Further, each UI displayed in the apparatus A is based on the same hierarchical structure as that of the UI displayed in the apparatus B. Because of this feature, a great degradation of the operability may be prevented even when, for example, the user operates the FAX application (of the apparatus B) from the apparatus A.

Further, the menu generation unit 14 uses the customization data to, construct the UI group (that is, modifies the menus). The customization data indicates whether the part is to be displayed for each of the parts. Namely, when the "display switch" is "OFF" in the customization data, the apparatus A does not display the part corresponding to the relevant part name (item name). For example, when the "display switch" corresponding to the "document type" is "OFF", the part "document type" will not be displayed in the fourth line of UI2 and accordingly UI3 as well.

After the menu generation unit 14 generates the UI group, the menu update unit 15 updates the UIs based on the "setting information" of the operation condition data. To update the UI is to reflect the user setting into the UI. By doing in this way, it may become possible to duplicate the UI of the apparatus A based on the state that is finally set by the user in the apparatus B.

For example, in FIG. 6, the "setting information" indicates that the "characters■picture" and the "readable direction" are selected in the "document type" and the "document set direction", respectively (indicated by using small black circles). Therefore, the menu update unit 15 updates (modifies) the UI3 by, for example, highlighting the "characters■picture", so that the "characters■picture" can be easily distinguished from other parts (choices). Therefore, even when the user operates the apparatus A to display the UI3, the user will find that the part "characters■picture" in the second line is highlighted (being selected).

Further, when it is necessary to input a telephone number or the like, a user may input the number into a certain line using the ten keys.

(2) Display Capacity of LCD Section 117 of Apparatus B<Display Capacity of LCD Section 117 of Apparatus A FIG. 8 illustrates an example of the UI displayed by the apparatus A. In this example, it is assumed that the resolution of the LCD section 117 of the apparatus A is WVGA, and the LCD section 117 of the apparatus B is the 4-line display device. In such a case, as described above, it may not be possible to duplicate (display) the same UI simply by using the menu layout data. To resolve the problem, in this embodiment, the menu generation unit 14 generates the UIs by using only the operation condition data and the customization data.

In this example, the menu generation unit 14 generates the UIs having WVGA resolution. FIG. 8 schematically illustrate the generation of the UI group. In FIG. 8, there are provided the "text", the "fixed button", and the "utility button" as the parts to construct the UIs. The "text" is associated with the "title01" in the UIs. The "fixed button" is associated with the "OK" button and the "cancel" button in the UIs. The "utility button" is associated with the "button01" and the "button02"

in the UIs. Each of the display (layout) positions of the "text" and those buttons is registered in the respective "coordinate".

The images of the "fixed buttons" and the "utility buttons" and the "coordinate" data are stored in the storage device 59 of the apparatus A in advance. The menu generation unit 14 generates the UIs by applying the relevant part names of the UIs to the "text" and the "utility buttons". The menu generation unit 14 generates the UIs based on the operation condition data.

The UI1 is the UI at the shallowest (highest) hierarchy in the FAX application. The menu generation unit 14 generates the UI1 by associating the application name "FAX" in FIG. 6 with the "text", and further associating the "read setting" at the hierarchy of the "operation name" corresponding to the "part name" and the "transmission" (not shown in FIG. 6) with the "utility buttons". By doing this, in the UI1, "read setting" button and the "transmission" button are displayed as the "button01" and the "button02", respectively.

The UI2 is the UI when the "read setting" is selected in the UI1. The menu generation unit 14 generates the UI2 by associating the "read setting" at the hierarchy of the "operation name" (i.e., the parent hierarchy) with the "text", and further associating the "document type", the "document setting direction", and the "natural density" at the hierarchy of the "item name" with the "utility buttons". Therefore, in the UI2, the "document type" button, the "document setting direction" button, and the "natural density" button are displayed as the "button01", the "button02" and a "button03" (not shown), respectively.

The UI3 is the UI displayed when the "document type" is selected in UI2. The menu generation unit 14 generates the UI3 by associating the "document type" at the hierarchy of the "item name" (i.e., the parent hierarchy) with the "text", and further associating the "characters", the "characters■picture", the "picture", the "light draft", and the "map" at the hierarchy of the "selectable values" with the "utility buttons". Therefore, in the UI3, for example, the "characters" button, the "characters■picture" button, and the "picture" button are displayed as the "button01", the "button02" and a "button03", respectively.

Further, the menu generation unit 14 uses the customization data to construct the UI group. Similar to the case (1) above, when the "display switch" is "OFF" in the customization data, the menu generation unit 14 does not display the part corresponding to the part name (item name). For example, when the "display switch" corresponding to the "document type" is "OFF", the part "document type" corresponding to the button01 will not be displayed. By doing in this way, the menu generation unit 14 determines whether each "utility button" is to be displayed based on the customization data, and switches the display of the "utility button" based on the determination.

Further, the menu update unit 15 updates the UIs based on the "setting information" of the operation condition data. The "setting information" of the operation condition data includes the current selection status of the buttons of the UIs. Therefore, based on the "setting information" of the operation condition data, the menu update unit 15 causes the "buttonXX" to be selected, the "buttonXX" corresponding to the "setting information" where the small black circle is indicated. Specifically, for example, the menu update unit 15 highlights the "buttonXX". By doing in this way, it may become possible to display the UI3 where the "characters■picture" button is highlighted even when the user displays the UI3 in the apparatus A for the first time.

As described with reference to FIGS. 7 and 8, in this embodiment, in a case where the panel types of the apparatuses A and B are different from each other, and when a larger amount of data can be displayed in the panel type of the apparatus A than in the panel type of the apparatus B or when a larger amount of data can be displayed in the panel type of the apparatus B than in the panel type of the apparatus A, it may become possible to reflect the customized results by a user in the apparatus B into the UIs displayed in the apparatus A and accordingly improve the operability. The amount of display data of the operation panel 50 may be determined by the menu construction unit 12 based on the panel type.

Further, when the panel type of the apparatus A is the same as the panel type of the apparatus B (namely, apparatuses A and B have the same display amount capability), the menu generation unit 14 may duplicate the same UI simply using the menu layout data. The procedure in this case is described below. Further, when the panel type of the apparatuses A is the same as the panel type of the apparatus B, the UI construction (generation) procedure in the above (2) may also be applied.

Sequence

Menu Generation Procedure

Figure 9A:
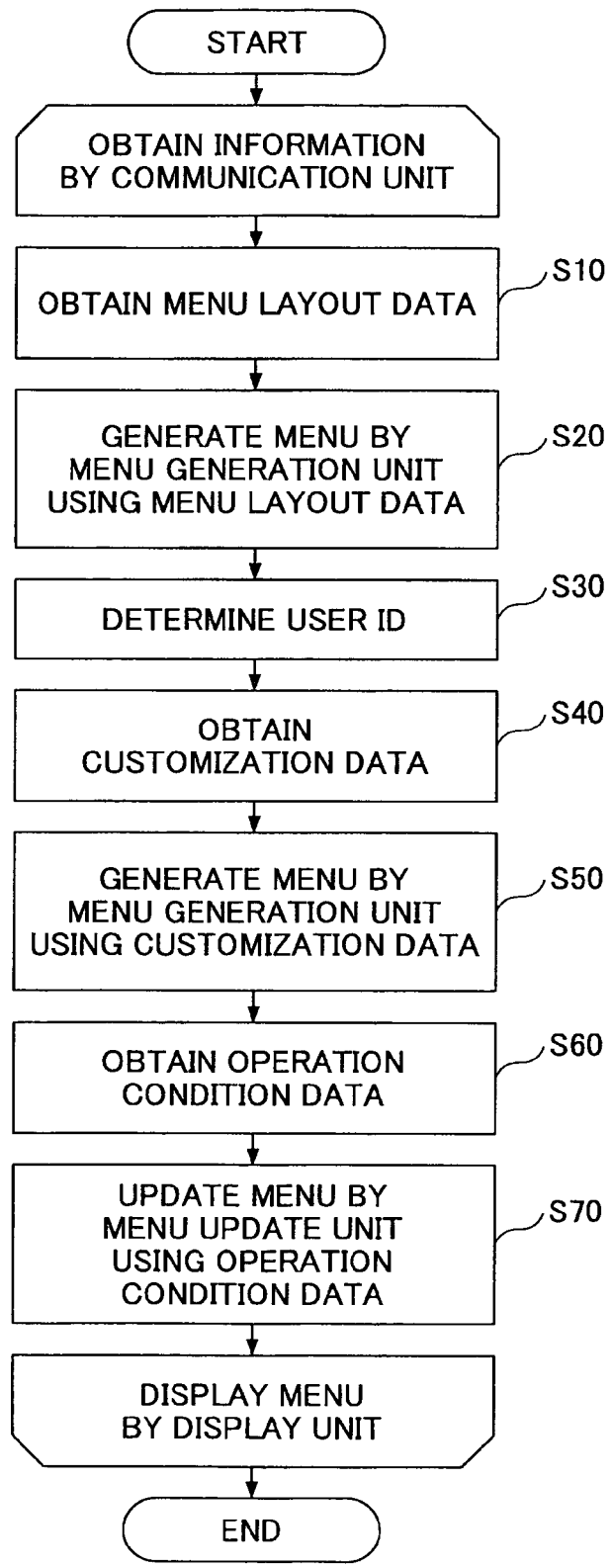
FIG. 9A is a flowchart illustrating a procedure of generating an UI to be displayed by a menu configuration unit.

FIG. 9A is an exemplary flowchart illustrating the procedure of generating the UI by the menu construction unit 12. In the procedure, first, a user moves to the apparatus A. The apparatus A has already collected the information of the functions of other apparatuses on the same•floor, in the same company or the like, so that when the user operates the apparatus A, the device cooperation unit 16 causes the operation panel 50 to display a list of apparatuses that can perform, for example, the FAX transmission. Therefore, it may become possible for the user to select one or more desired apparatuses having the FAX function. Further, this selecting step by the user may be omitted.

The user operates to use the FAX function through the operation panel 50. The apparatus A receives the operations and sends a request for the data to the apparatus B. Specifically, when the FAX key 115 is pressed down, the device cooperation unit 16 of the apparatus A receives the operation as the operation to perform the FAX transmission. Further, for example, in a case where no FAX key 115 is provided on the apparatus A where no FAX application is registered, another hard key or predetermined operation on the UI menu may be provided in the apparatus A to use the FAX function. Further, before the apparatus A sends the request for the data to the apparatus B, a message like "Will you use apparatus B for FAX transmission (using device cooperation function)?" may be displayed. Then, when the user reads the message and presses the OK button, the procedure of FIG. 9A is started.

Upon receiving the operation to use the device cooperation function by the user, the menu construction unit 12 obtains the menu layout data from the apparatus B (step S10). Actually, not only the menu layout data but also the operation condition data and the customization data are obtained. Further, the menu construction unit 12 compares the panel type of the apparatus B with the panel type of the apparatus A, and determines the construction (generation) method of the UIs based on the comparison result.

Herein, it is assumed that the menu generation unit 14 has obtained the panel type (including, for example, display type, resolution, monochrome or colored display) of the apparatus B based on the communications with the apparatus B or as the initial settings.

Figure 9B:

FIG. 9B illustrates an example of the menu layout data transmitted from the apparatus B to the apparatus A in step 10. As described above, the "image", the "initial layout", and the "association with UI" corresponding to each "part name" are transmitted.

Figure 9C:
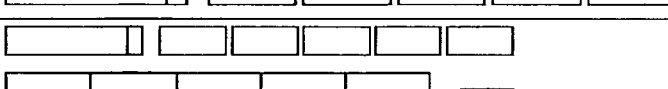

Next, the menu generation unit 14 generates the UI group using the menu layout data (step S20). The procedure of generating the UI group is described above. FIG. 9C illustrates examples of the generated menus in two cases: when the LCD section 117 of the apparatus B is the 4-line display device, and when the resolution of the LCD section 117 of the apparatus A is WVGA. When both apparatuses have the WVGA resolution, the menu generation unit 14 may duplicate the UI of the FAX application of the apparatus B on the apparatus A. In this case of the WVGA, for example, the user name may also be displayed on each button (not shown in FIG. 9C due to limitations of space).

Next, the menu generation unit 14 confirms (specifies) the user ID of the user operating the apparatus A. This is for obtaining the customization data and specifying the customization data corresponding to the user. To that end, when the user logs in before operating the apparatus A, the menu generation unit 14 reads the user ID used during the log-in operation. On the other hand, when the user does not log in before operating the apparatus A, the menu generation unit 14 may read the user ID of a guest user.

Figures 9D, 9E:
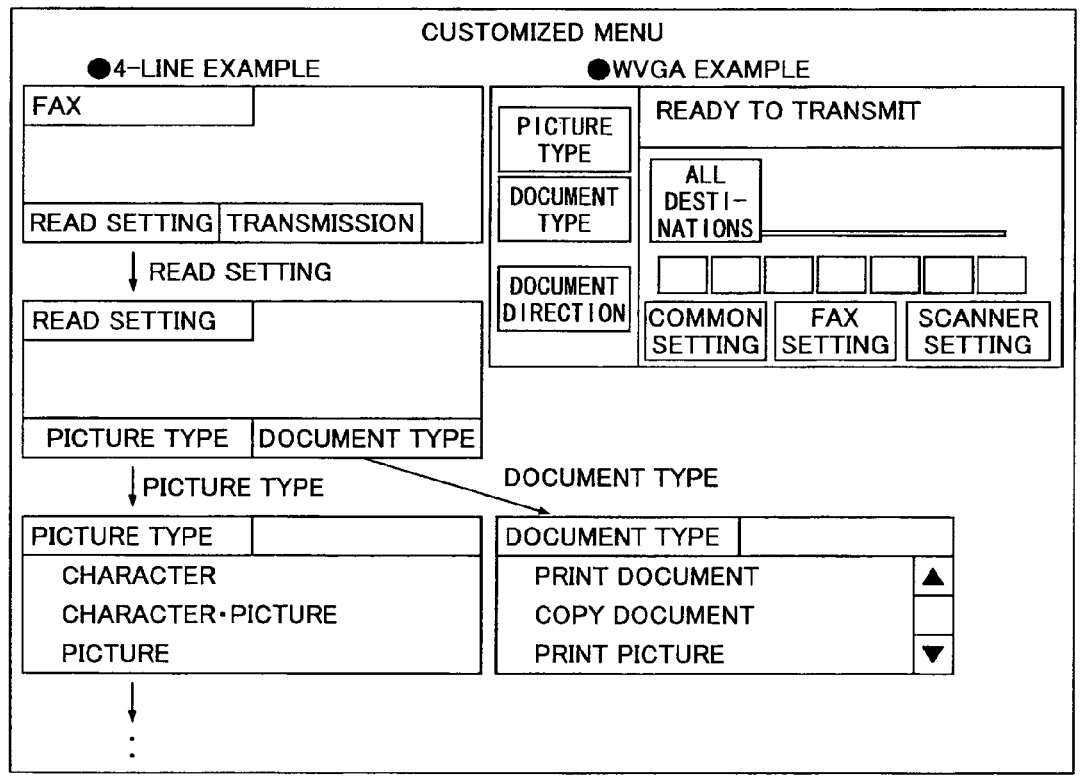

The menu generation unit 14 obtains the customization data from the apparatus B (step S40). FIG. 9D illustrates an example of customization data of user 1.

The menu generation unit 14 customizes (updates) the generated UIs using the customization data (step S50). FIG. 9E illustrates an example of the customization results. When the 4-line example in FIG. 9C is compared with the 4-line example in FIG. 9E, FIG. 9C includes the slide bar but FIG. 9E does not. This is because, due to the customization, the parts where the "display switch" is set "OFF" in the customization data are not displayed in the UI, and it becomes possible to display all the part names without using the slide bar.

Similarly, when the WVGA example in FIG. 9C is compared with the WVGA example in FIG. 9E, there are some differences in the number of buttons and the positions of the buttons. The reason for the differences in the number of the buttons is that after the customization (update), the parts where the "display switch" is set "OFF" in the customization data are not displayed in the UI. Further, the reason why the positions of some buttons have changed is that the positions of the buttons are also customized based on the "coordinate" data of the customization data.

Next, the menu update unit 15 obtains the operation condition data (step S60). FIG. 9F illustrates an example of the operation condition data. In this example, due to the limitation of the space, the "setting information" is described in a manner such that the selected data of the "selectable values" are highlighted without using the small black circles as used in FIG. 6.

The menu update unit 15 updates the UIs using the operation condition data (step S70). FIG. 9G illustrates an example of the update result of the UI. When the 4-line example in FIG. 9E is compared with the 4-line example in FIG. 9G, the highlighted parts are determined and displayed based on the operation condition data in FIG. 9G. Similarly, when the WVGA example in FIG. 9E is compared with the WVGA example in FIG. 9G, some buttons are highlighted in FIG. 9G.

In the UI of FIG. 9G, the user inputs desired settings including, for example, the selection of the destination. The menu update unit 15 receives the user's operations, and updates the "setting information" of the operation condition data based on the user's inputs (operations), the operation condition data having been obtained from the apparatus B. By doing this, the menu update unit 15 updates the UI again. By doing in this way, it may become possible to reflect the user's operations into the UI by the menu construction unit 12.

Finally, when the user presses the start key, the device cooperation units 16 and 25 start performing the device cooperation. When considered that the document of the user is read by the apparatus A, the device cooperation may be performed by reading the document by the apparatus A, and the FAX transmission is performed by the apparatus B. The device cooperation unit 25 generates a job for the application requested by the apparatus A. This application (FAX application) controls a job to read the document by the scanner engine controller 57 of the apparatus A based on the setting information set by the user and a job to transmit the image data by the FAX engine controller 83 of the apparatus B based on the setting information (destination) set by the user. However, the number of jobs may be one in all the apparatuses involved in the device cooperation.

As described above, it may become possible for a user to perform the FAX transmission from the apparatus B by operating the apparatus A having no FAX function.

Figure 10B:
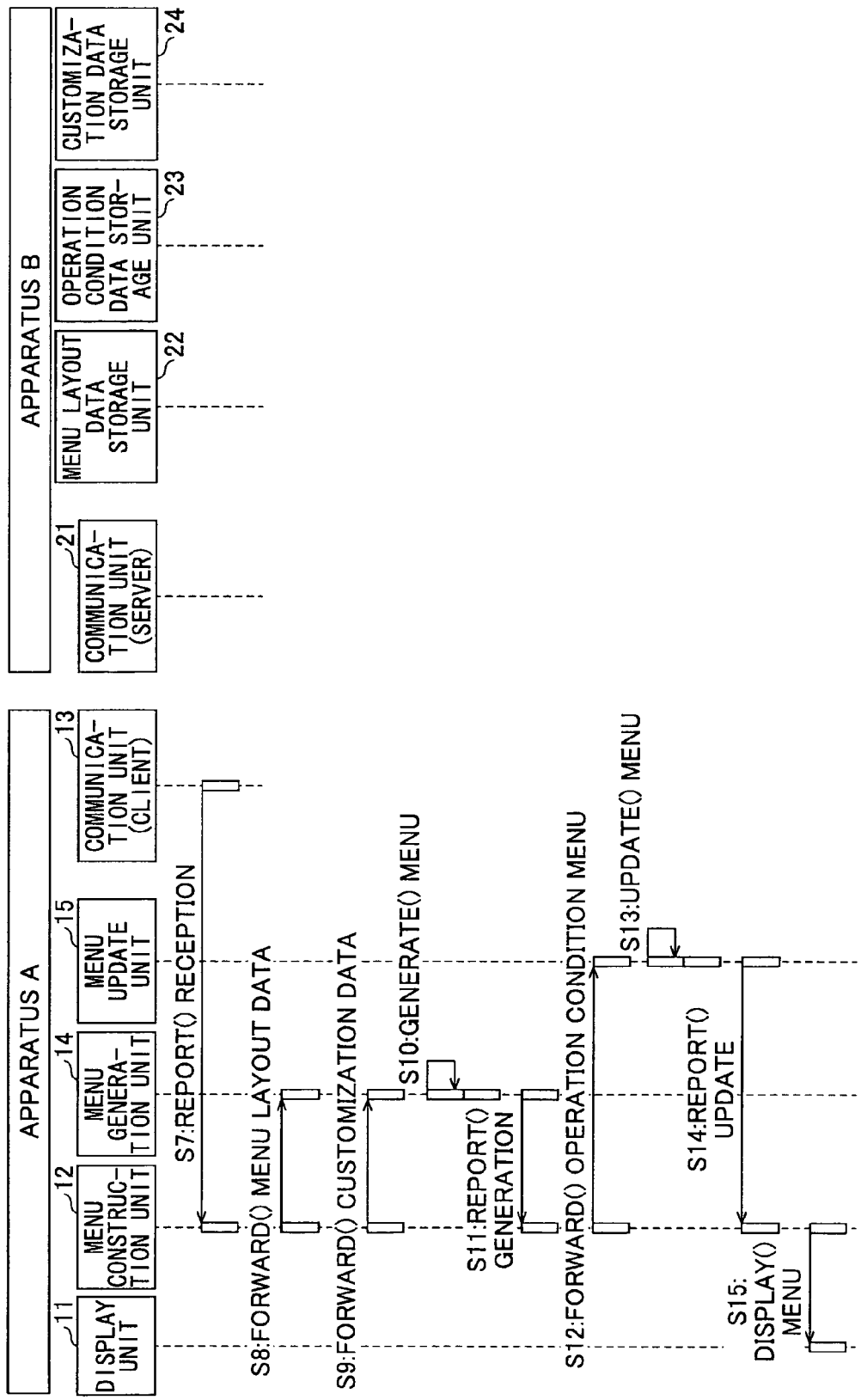

FIGS. 10A and 10B illustrate an example sequence diagram illustrating a procedure of performing the device cooperation between the apparatuses A and B. The menu construction unit 12 starts requesting for the menu generation information based on the user's operation as the trigger (step S1). Specifically, for example, the PORT command of the FTP is used to designate the IP address of the apparatus B. Upon the response from the apparatus B, the communication unit 13 sends a request for transmitting the menu generation information to the apparatus B by designating the file name of the menu generation information (step S2). The IP address of the apparatus B and the file name of the menu generation information are stored in the apparatus A.

The communication unit 21 sends a request for the menu layout data to the menu layout data storage unit 22 (step S3). The menu layout data storage unit 22 transmits the menu layout data to the communication unit 21 (step S3.1). The communication unit 21 stores the menu layout data in a buffer or the like.

Further, the communication unit 21 sends a request for the operation condition data to the operation condition data storage unit 23 (step S4). The operation condition data storage unit 23 transmits the operation condition data to the communication unit 21 (step S4.1). The communication unit 21 stores the operation condition data in the buffer or the like.

Further, the communication unit 21 sends a request for the customization data to the customization data storage unit 24 (step S5). The customization data storage unit 24 transmits the customization data to the communication unit 21 (step S5.1). The communication unit 21 stores the customization data in the buffer or the like.

Next, the communication unit 21 transmits the menu generation information (i.e., the menu layout data, the operation condition data, and the customization data) to the communication unit 13 of the apparatus A (step S6).

The communication unit 13 stores the menu generation information into the RAM 53 or the like, and reports the receipt of the menu generation information to the menu construction unit 12 (step S7).

The menu construction unit 12 transmits the menu display data to the menu generation unit 14, and requests for the construction (generation) of the UI group (step S8). Further, the menu construction unit 12 transmits the customization data to the menu generation unit 14 (step S9).

The menu generation unit 14 generates the UI group based on the menu layout data and the customization data (step S10). The specific procedure of the steps is described above with reference to FIGS. 9A through 9G, 10A and 10B. The menu generation unit 14 stores the generated UI group into the RAM 53 or the like, and reports the generation of the UI group to the menu construction unit 12 (step S11).

The menu construction unit 12 transmits the operation condition data to the menu update unit 15, and requests for the update of the UI group (step S12). The menu update unit 15 updates the UI group using the operation condition data (step S13). The specific procedure of the steps is described above with reference to FIGS. 9A through 9G, 10A and 10B.

The menu construction unit 12 stores the updated UP group into the RAM 53 or the like, and reports the completion of the update to the menu construction unit 12 (step S14).

The menu construction unit 12 causes the display unit 11 to display the UI (step S15). The menu construction unit 12 displays the UI selected from the UI group in accordance with the user's operations.

As described above, it may become possible for the apparatus A to use the apparatus B for the FAX transmission purposes. Further, there is a know technique called "substitute reception" where, for example, the FAX image data received by the apparatus B may be transmitted to the apparatus A to be printed by the apparatus A. In this case as well, it may become possible for the apparatus A to receive the menu generation information of the apparatus B and generate the UI based on the menu generation information.

In Using Service

In the application described above, several necessary services are executed together to operate as the application.

FIG. 11 schematically illustrates an example of the applications and the services. Further, in FIG. 11, it is assumed that the apparatuses are used as stand-alone apparatuses. As illustrated in FIG. 11, there are a copy application 31, and a reading service 41 and a printing service 42 which are necessary for the copy application 31 registered in the apparatus A. Actually, the copy application 31, the reading service 41, and the printing service 42 are realized by a program.

In addition to that, in the apparatus B, there are registered a FAX application 32 and a FAX transmission service 43. Actually, the FAX application 32 and the FAX transmission service 43 are realized by a program. Even though there may be a slight difference in the versions, the programs in the apparatuses A and B are described based on the same design concept.

Figure 12:
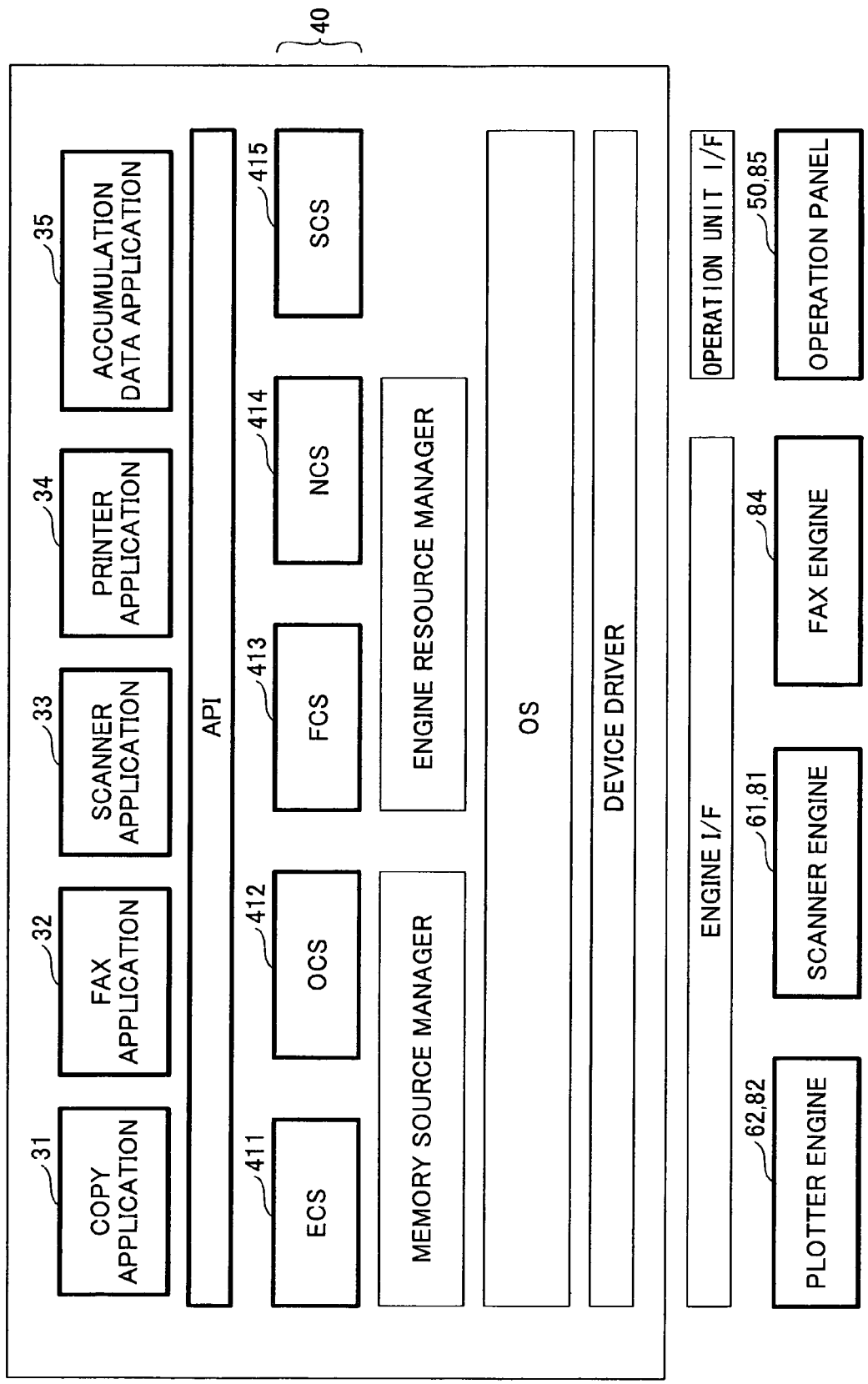
FIG. 12 is a drawing illustrating an example of software configuration.

These services are known as the control service having a software configuration as illustrated in FIG. 12. As illustrated in FIG. 12, the control service includes processes such as an ESC (Engine Control Service) 411, an OCS (Operation-panel Control Service) 412, an FCS (FAX Control Service) 413, and an NCS (Network Control Service) 414, and an SCS (System Control Service). However, the apparatus A does not include the FAX application 32, the FCS 413, and the FAX engine 84.

The reading service 41 and the printing service 42 correspond to the ESC 411. The FAX transmission service 43 corresponds to the FCS 413. As is indicated in FIG. 12, each application uses the corresponding service by calling the relevant control service 40 via the API.

The copy application 31 of each of the apparatuses A and B in FIG. 11 reads image data from a document, and prints the image data on a sheet by using the reading service 41 and the printing service 42. Further, the FAX application 32 of the apparatus B reads image data from a document and transmits the image data to the destination by using the reading service 41 and the FAX transmission service 43. Further, upon receiving the image data, the FAX application 32 further uses the printing service 42. In the apparatus B, the copy application 31 and the FAX application 32 use the same reading service 41.

Figure 13:
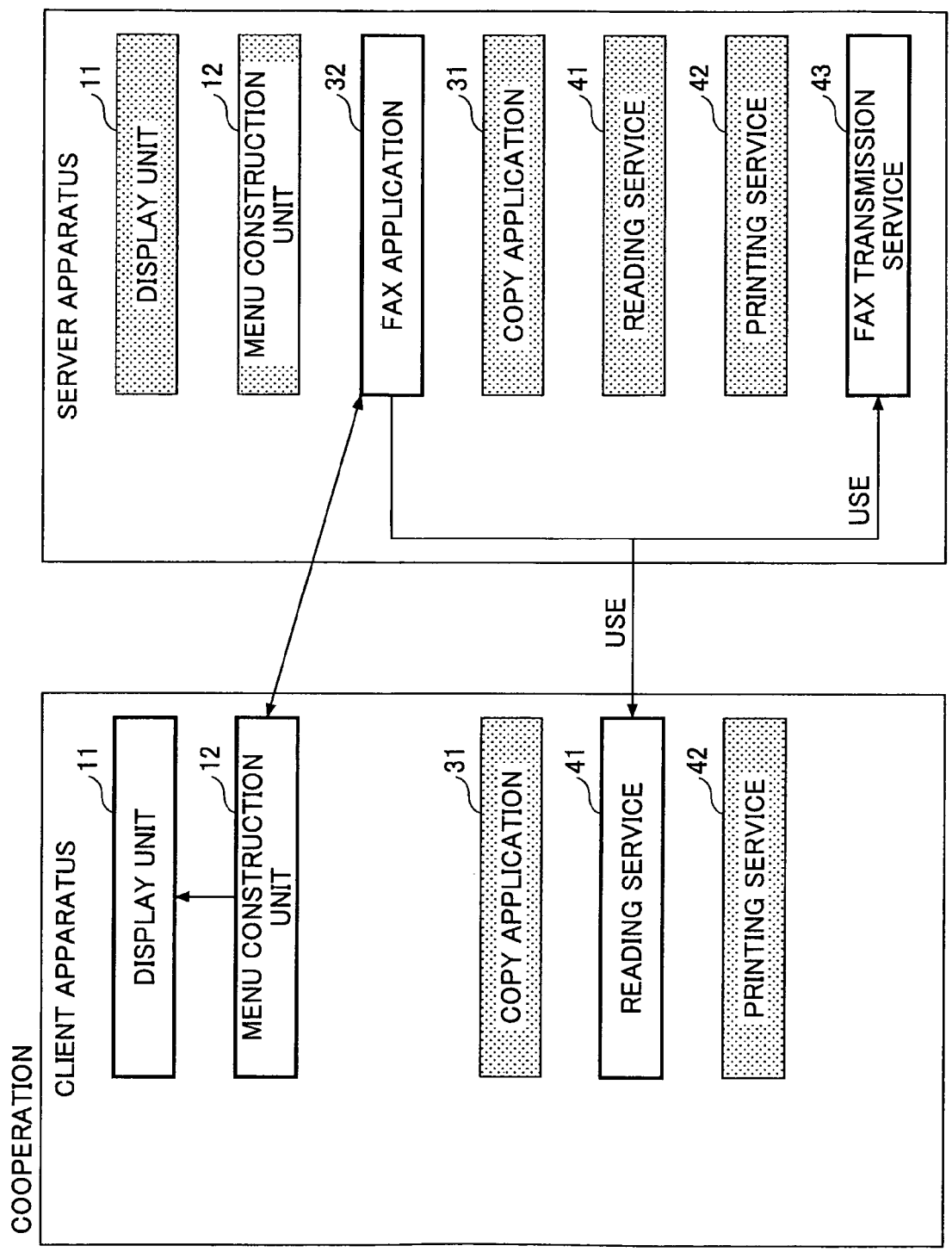
FIG. 13 is a schematic drawing illustrating an example of applications and services when a device cooperation function is being used.

It is the device cooperation function that makes it possible to change the use relationships within each of the apparatuses into the use relationships between the apparatuses. FIG. 13 schematically illustrates an example of the relationships between the application and services when the device cooperation function is used. In FIG. 13, the same elements having the same reference numerals as those in FIG. 11 are used and the descriptions thereof are omitted. As described above, since the apparatus A does not include the FAX application 32 and the FAX transmission service 43, the apparatus A uses the FAX application 32 and the FAX transmission service 43 of the apparatus B by using the device cooperation function.

The display unit 11 and the menu construction unit 12 exist in the apparatus A (i.e., the apparatus on the client side), and the menu construction unit 12 obtains the menu generation information from the FAX application 32 of the apparatus B (i.e., the apparatus on the server side), and constructs (generates) the UI group. On the other hand, the FAX application 32 of the apparatus B uses the FAX transmission service 43 and the reading service 41 in the same apparatus B.

The reason why one apparatus can use a service of the other apparatus as described above is that the applications and services are separated from each other and that different applications can use a common (the same) service. In other words, the (usable) combinations between the applications and the services are not being fixed. Because of this feature, for example, it may become possible that the image data read and formed by the reading service 41 of the apparatus A are transmitted to the destination by the FAX transmission service 43 of the apparatus B.

FIGS. 14A and 14B illustrate an example sequential diagram of the procedure from reading a document to transmitting the FAX using the services.

A user operates the FAX key 115 on the display unit 11 (specifically, the operation panel 50) to start the device cooperation function. Upon the receipt of the user's operation, the display unit 11 sends a request for the use of the FAX application to the menu construction unit 12 (step S110).

The menu construction unit 12 sends a request for the data to the FAX application 32 of the apparatus B (step S120). Upon the receipt of the request, the FAX application 32 sends a request for the operation condition data to the FAX transmission service 43 in the same apparatus B (step S130), and obtains the operation condition data from the FAX transmission service 43 (step S132).

Further, the FAX application 32 sends a request for the operation condition data to the reading service 41 of the apparatus A (step S140), and obtains the operation condition data from the reading service 41 (step S142). This is performed because the reading service 41 of the apparatus A is provided in the UI of the apparatus A in this FAX application. The FAX application 32 merges those two operation conditions data (step S150).

Further, the FAX application 32 sends a request for the menu layout data and the customization data to the storage device 79 of the apparatus B (step S160). The storage device 79 transmits the menu layout data and the customization data to the FAX application 32 (step S162).

Next, the FAX application 32 transmits the menu generation information to the menu construction unit 12 (step S170).

The menu construction unit 12 constructs (generates) the UI group bases on the method described with reference to FIGS. 9A through 9G, 10A and 10B (step S180). The menu construction unit 12 causes the display unit 11 to display the UI (step S190).

The user looks at the UI and operates the display unit 11 to input setting conditions (setting information) settable for the FAX application 32. Upon the receipt of the setting information, the display unit 11 inputs (transmits) the setting information to the menu construction unit 12 (step S210). When necessary, the menu construction unit 12 updates the operation condition data based on the input setting information (step S220). The menu construction unit 12 updates the UI based on the updated operation condition data (step S230), and displays the updated UI on the display unit 11 (step S240).

When the user completes the settings of the FAX application 32 and presses down the start key 122, the display unit 11 receives and reports the user's operation to the menu construction unit 12 (step S310). The menu construction unit 12 transmits a job execution request to the FAX application 32 of the apparatus B (step S320). Along with this request, the menu construction unit 12 transmits the setting information set by the user or all the operation condition data to the FAX application 32.

Upon the receipt of the job execution request, the FAX application 32 generates a job A using the setting information of the reading service 41 as parameters, the setting information being a part of the operation condition data, and sends a request for the reading execution (job execution) to the reading service 41 of the apparatus A (step S330). The specific description contents of the job may be made common between the apparatuses A and B. Therefore, the job A and the execution request of the job A may be transmitted to the reading service 41. Further, the job A and a job B described below may be executed as a single job.

The reading service 41 drives the scanner engine 61 to optically read the document, and generate image data (step S340). The reading service 41 reports the completion of the reading and transmits the read image data to the FAX application (step S350).

Herein, to feed back the information indicating the completion of the reading to the user, the FAX application 32 transmits a job status report to the menu construction unit 12 (step S360). Upon the receipt of the job status report, the menu construction unit 12 updates the UI so as to reflect the status change into the UI (step S370). The menu construction unit 12 causes the display unit 11 to display the updated UI (step S380).

On the other hand, after receiving the image data, the FAX application 32 generates a job B using the setting information of the FAX transmission service 43 and the image data as parameters, the setting information being a part of the operation condition data, and sends a request for the FAX transmission (job execution) to the FAX transmission service 43 of the apparatus B (step S390). The FAX transmission service 43 drives the FAX engine 84 to transmit the image data (step S400).

After the completion of the transmission, the FAX transmission service 43 reports the completion to the FAX application 32 (step S410). FAX application 32 transmits the job status report to the menu construction unit 12 (step S420).

Upon the receipt of the job status report, the menu construction unit 12 updates the UI so as to reflect the status change into the UI (step S430). The menu construction unit 12 causes the display unit 11 to display the updated UI (step S440).

As described above, in the device cooperation system 200 according to this embodiment of the present invention, the customization data of the apparatus B may be applied to the UI generated by the apparatus A on the client side. Because of this feature, it may become possible to improve the user operability.

Application Other than FAX

A method of constructing (generating) the UI according to this embodiment of the present invention may also be applied to applications other than the FAX application. For example, there may be case where a single document file is to be printed in parallel using plural apparatuses A and B (parallel printing), or the apparatus A sends a request for the execution of the alternate printing to the apparatus B.

In those cases, the apparatus A receives the menu generation information for the UI of the copy application of the apparatus B, and generates the UI. In the parallel printing, the apparatus A reads a document and prints the image data of the document. At the same time, the apparatus A also transmits the image data to the apparatus B, so that the apparatus B can print the image data while the apparatus A prints the image data. As described above, the apparatus A may also receives the menu generation information for the UI of the function of the apparatus A, and generate the UI.

In the alternate printing, the apparatus A reads a document and generates the image data of the document, and transmits the image data to the apparatus B, so that the apparatus B prints the image data.

Further, when the apparatuses A and B have the same functions but there is an optional function (e.g., bind, staple, punch or the like) included in the apparatus B only, a user may also set (user) the optional function from the UI constructed (generated) by the apparatus A.

Further, the method of constructing the UI according to this embodiment of the present invention may also be applied to share the document data, an address book and the like stored in the other apparatus.

Figure 15:
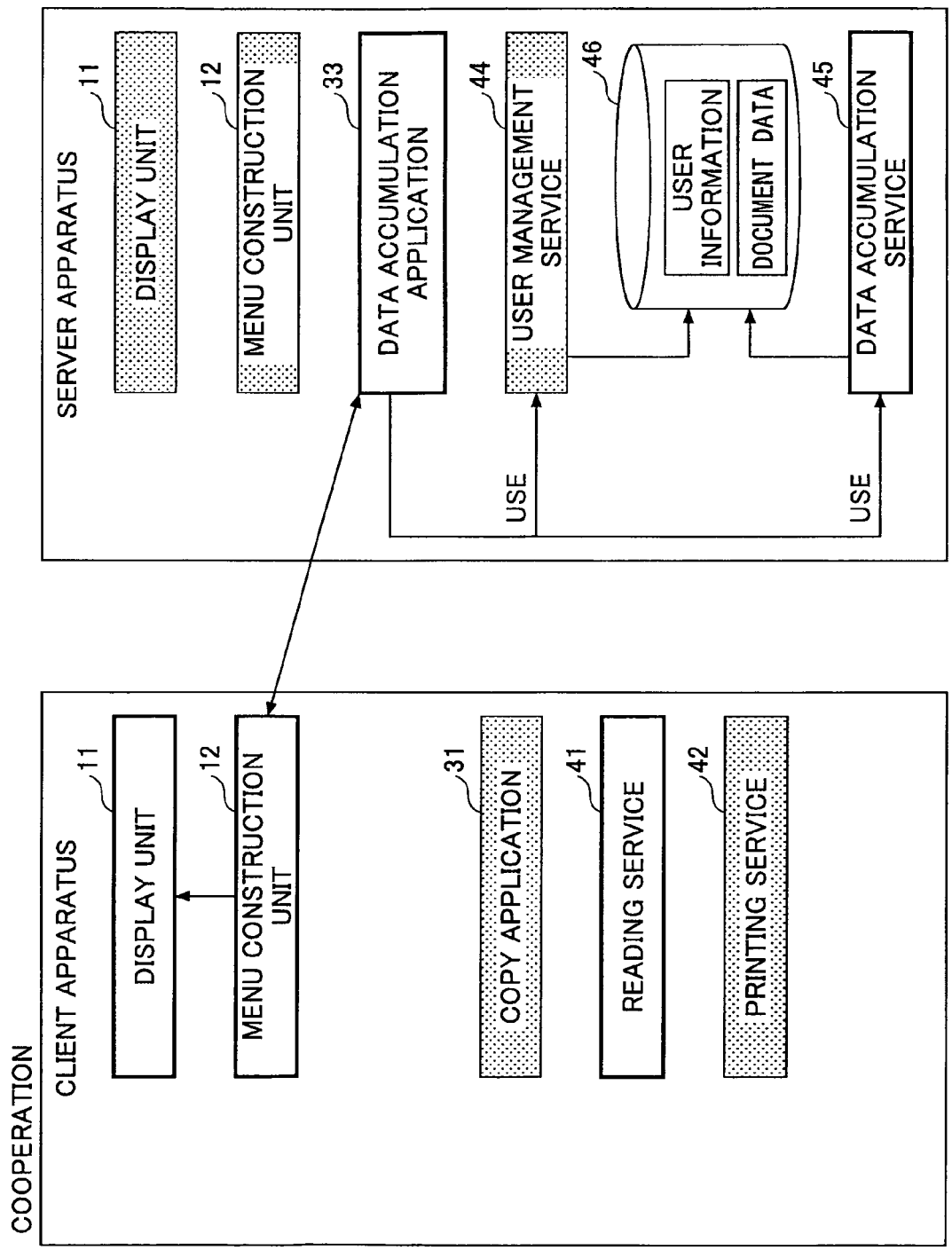
FIG. 15 a schematic drawing illustrating an example of the applications and the services.

FIG. 15 schematically illustrates the applications and the services. As illustrated in FIG. 15, in the apparatus A, the copy application 31, the reading service 41, and the printing service 42 are registered, the reading service 41 and the printing service 42 being necessary for the copy application 31.

On the other hand, the apparatus B includes a data accumulation application 33, a user management service 44, a data accumulation service 45, and a database 46. The database 46 stores document files (document data) and user information of the apparatus B.

To browse the document file or the address book of the apparatus B, the apparatus A receives the menu generation of the UI from the apparatus B and constructs the UI. By doing this, it may become possible for a user to operate the UI for the data management service 44, and to specify a desired document file or user information. Namely, the apparatus A may access to the document file and the address book of the apparatus B. The data accumulation application 33 of the apparatus B transmits the document file and the address book along with the UI. Therefore, apparatus A may display the document file and the address book of the apparatus B on the display unit 11 of the apparatus A. Further, the apparatus may restrict access to the data based on the user authority illustrated in FIG. 6.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus to be connected to an apparatus that includes a first display unit displaying a menu to accept a user's operation, a layout data storage unit storing layout data of a display part that is to be displayed on the menu, a display part data storage unit storing part data where a part name of the display part is registered in accordance with a hierarchy structure of the menu, and a customization data storage unit storing customization data and a user ID, the customization data being associated with the user ID and indicating whether the display part is to be displayed or a display manner of the display part, the image processing apparatus comprising:

a receiving unit that receives the layout data, the part data, and the customization data for the menu from the apparatus to provide a function of the apparatus;

a menu construction unit that generates the menu based on at least the part data;

a menu generation unit that modifies the menu based on the customization data, the menu having been generated by the menu construction unit;

a second display unit that displays the menu modified based on the customization data and accepts an operation for the display part; and a device cooperation unit that requests the apparatus to provide the function and setting information of the function, the function having been accepted via the second display unit, wherein applications and services in the image processing apparatus are separated and applications and services in the apparatus are separated, such that an application in only one of the image processing apparatus and the apparatus can be used by the other of the image processing apparatus and the apparatus that does not contain the application, via a shared service among the image processing apparatus and the apparatus.

2. The image processing apparatus according to claim 1, wherein the customization data indicates whether display of the display part is permitted for a user, and the menu generation unit generates the menu including only the display part permitted to be displayed for the user of the image processing apparatus in the customization data.

3. The image processing apparatus according to claim 1, wherein the function is included in the apparatus but is not included in the image processing apparatus.

4. The image processing apparatus according to claim 1, wherein when determining that a first type information of the first display unit differs from a second type information of the second display unit, the menu construction unit generates the menu that displays the display part selected in layers based on the hierarchy structure without using the layout data.

5. The image processing apparatus according to claim 4, wherein when determining that a displayable information amount of the second display unit is greater than the displayable information amount of the first display unit, the menu construction unit generates the menu by associating the display part with the part name, the display part being stored in advance and being displayable on the second display unit, the part name being selected in the layers based on the hierarchy structure.

6. The image processing apparatus according to claim 4, wherein when the second display unit displays text in lines, the menu construction unit generates the menu by arranging the part name into a predetermined line, the part name being selected in the layers based on the hierarchy structure.

7. The image processing apparatus according to claim 4, wherein when determining that the first type information of the first display unit is the same as the second type information of the second display unit, the menu construction unit generates the menu by determining a layout of the display part on the menu displayed on the first display unit by using the layout data and duplicates the menu on the second display unit.

8. The image processing apparatus according to claim 1, further comprising:

a menu update unit that updates the menu in a manner such that the display part associated with the part name by the display part data storage unit is visually distinguished from another display part, wherein the part name is specified by setting information, and the setting information is stored in the display part data storage unit and specifies the part name where selection of the part name is being accepted.

9. The image processing apparatus according to claim 1, wherein when the apparatus includes a FAX function and the image processing apparatus does not include the FAX function but includes a document read function, and the receiving unit receives the layout data, the part data, and the customization data of the FAX function, and the second display unit displays the menu for transmitting a FAX and accepts an operation to specify a destination.

10. The image processing apparatus according to claim 9, wherein the part name includes destination information of the FAX, and the second display unit displays the display part along with destination information on the menu.

11. The image processing apparatus according to claim 10, wherein the menu generation unit selects the destination information to be displayed on the menu based on authentication information of a user of the image processing apparatus, the authentication information being registered in the customization data.

12. The image processing apparatus according to claim 1, wherein when each of the apparatus and the image processing apparatus includes a copy function and the apparatus includes an optional function that is not included in the image processing apparatus, the receiving unit receives the layout data, the part data, and the customization data of the copy function including the optional function, and the second display unit displays the menu for using the optional function.

13. The image processing apparatus according to claim 1, wherein when the apparatus includes a document accumulation function, the receiving unit receives the layout data, the part data, and the customization data of the document accumulation function, and the second display unit displays the menu for using the document accumulation function.

14. A device cooperation system comprising:

a first apparatus; and a second apparatus that uses a function of the first apparatus, wherein the first apparatus includes a first display unit displaying a menu to accept a user's operation, a layout data storage unit storing layout data of a display part that is to be displayed on the menu, a display part data storage unit storing part data where a part name of the display part is registered in accordance with a hierarchy structure of the menu, and a customization data storage unit storing customization data and a user ID, the customization data being associated with the user ID and indicating whether the display part is to be displayed or a display manner of the display part, and the second apparatus includes a receiving unit that receives the layout data, the part data, and the customization data for the menu to provide a function of the apparatus, a menu construction unit that generates the menu based on at least the part data, a menu generation unit that modifies the menu based on the customization data, the menu having been generated by the menu construction unit, a second display unit that displays the menu modified based on the customization data and accepts an operation for the display part, and a device cooperation unit that requests the apparatus to provide the function and setting information of the function, the function having been accepted via the second display unit, wherein
applications and services in the image processing apparatus are separated and applications and applications and services in the apparatus are separated, such that an application in only one of the image processing apparatus and the apparatus can be used by the other of the image processing apparatus and the apparatus that does not contain the application, via a shared service among the image processing apparatus and the apparatus.

15. A non-transitory computer-readable recording medium comprising a program encoded and stored in a computer readable format to cause a CPU of an image processing apparatus to be connected to an apparatus including a first display unit displaying a menu to accept a user's operation, a layout data storage unit storing layout data of a display part that is to be displayed on the menu, a display part data storage unit storing part data where a part name of the display part is registered in accordance with a hierarchy structure of the menu, and a customization data storage unit storing customization data and a user ID, the customization data being associated with the user ID and indicating whether the display part is to be displayed or a display manner of the display part, to execute a method comprising:
- a step of receiving the layout data, the part data, and the customization data for the menu to provide a function of the apparatus;
- a step of generating the menu based on at least the part data;
- a step of modifying the menu based on the customization data, the menu having been generated by the menu construction unit;
- a step of displaying the menu modified based on the customization data and accepting an operation for the display part; and
- a step of requesting the apparatus to provide the function and setting information of the function, the function having been accepted via the second display unit, wherein
  applications and services in the image processing apparatus are separated and applications and applications and services in the apparatus are separated, such that an application in only one of the image processing apparatus and the apparatus can be used by the other of the image processing apparatus and the apparatus that does not contain the application, via a shared service among the image processing apparatus and the apparatus.

16. The image processing apparatus according to claim 1, wherein the customization data is data associated with a user ID and the second display unit displays a modified menu based on the customization data.

* * * * *